US010709055B2

(12) United States Patent
Denis et al.

(10) Patent No.: US 10,709,055 B2
(45) Date of Patent: Jul. 14, 2020

(54) DROP CHUTE DEFLECTOR FOR ENHANCING ENTRAINMENT OF GRANULAR PRODUCT IN AN AIRSTREAM OF AN AGRICULTURAL PRODUCT APPLICATOR

(71) Applicant: CNH Industrial Canada, Ltd., Saskatoon (CA)

(72) Inventors: Joël Denis, Saskatoon (CA); Ryan C. Roberge, Edmonton (CA); Martin J. Roberge, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 15/988,187

(22) Filed: May 24, 2018

(65) Prior Publication Data

US 2019/0357423 A1 Nov. 28, 2019

(51) Int. Cl.

| | |
|---|---|
| ***B65G 53/14*** | (2006.01) |
| ***A01C 7/08*** | (2006.01) |
| ***A01C 15/00*** | (2006.01) |
| ***A01C 15/04*** | (2006.01) |
| *B65G 53/12* | (2006.01) |
| *A01C 7/06* | (2006.01) |

(52) U.S. Cl.
CPC .............. *A01C 7/082* (2013.01); *A01C 7/084* (2013.01); *A01C 15/003* (2013.01); *A01C 15/04* (2013.01); *A01C 7/06* (2013.01); *B65G 53/12* (2013.01)

(58) Field of Classification Search
CPC ...... B65G 53/14; B65G 11/20; B65G 11/206; A01C 7/081; A01C 7/082; A01C 15/04
USPC ........................... 406/144; 198/540; 111/174
See application file for complete search history.

(56) References Cited

U.S. PATENT DOCUMENTS 1,669,084 A * 5/1928 Grindle .................. B65G 53/06 406/23
2,586,705 A * 2/1952 Palmer .................. B01J 8/0015 422/213
2,734,782 A * 2/1956 Galle .................... B65G 53/22 406/132
2,955,877 A * 10/1960 Ecal .................... A01M 9/0092 406/47
3,115,278 A * 12/1963 Mylting ................. B65G 53/00 406/25
3,206,255 A * 9/1965 Gray ...................... B65G 53/00 406/93

(Continued)

*Primary Examiner* — Joseph A Dillon, Jr.
(74) *Attorney, Agent, or Firm* — Rebecca L. Henkel; Rickard K. DeMille

(57) ABSTRACT

A granular product delivery arrangement and method for an agricultural product applicator utilize a granular product deflector disposed below an inflow slot in a substantially horizontally extending supply line for enhancing entrainment of the granular product in an air stream passing through the supply line. The deflector has a body configured for enhancing entrainment of the granular product dropped through the slot into the flow of pressurized air passing through the supply line by directing the granular product toward an inner wall of the supply line adjacent the inflow slot, and directing the air stream away from the inflow slot in a manner that maintains a substantially unobstructed path for the airstream through a central area of the supply line and provides multiple zones within the supply line for the granular product to be entrained into the air stream.

18 Claims, 14 Drawing Sheets

(56) References Cited

U.S. PATENT DOCUMENTS

| | | | | | |
|---|---|---|---|---|---|
| 3,586,180 | A * | 6/1971 | Brock | B65G 47/5195 | 414/267 |
| 3,596,805 | A * | 8/1971 | Farmery | A01C 15/04 | 406/42 |
| 3,809,438 | A * | 5/1974 | Hubbard | B65G 53/60 | 406/106 |
| 4,145,981 | A * | 3/1979 | Jimenez | A01C 7/16 | 111/65 |
| 4,162,811 | A * | 7/1979 | Hobbs | B65G 53/14 | 406/144 |
| 4,215,824 | A * | 8/1980 | Weiste | A01C 7/084 | 239/655 |
| 4,420,279 | A * | 12/1983 | Easley, Jr. | B65G 53/525 | 406/14 |
| 4,767,062 | A | 8/1988 | Fletcher | | |
| 4,779,765 | A | 10/1988 | Neumeyer | | |
| 4,852,809 | A * | 8/1989 | Davis | A01C 15/04 | 239/654 |
| 5,092,526 | A * | 3/1992 | Takata | A01C 15/04 | 239/654 |
| 5,156,102 | A * | 10/1992 | Andersen | A01C 7/081 | 111/175 |
| 5,485,962 | A | 1/1996 | Moss | | |
| 5,575,225 | A * | 11/1996 | Smith | A01C 15/003 | 111/174 |
| 6,227,770 | B1 | 5/2001 | Poncelet et al. | | |
| 6,290,433 | B2 | 9/2001 | Poncelet et al. | | |
| 7,025,010 | B2 | 4/2006 | Martin et al. | | |
| 8,753,044 | B2 * | 6/2014 | Greenwood | B65G 53/50 | 406/108 |
| 9,702,103 | B2 * | 7/2017 | Wendorff | E01H 10/007 | |
| 9,738,200 | B2 | 8/2017 | Roberge et al. | | |
| 2006/0002774 | A1 * | 1/2006 | Stumborg | B65G 53/08 | 406/57 |
| 2006/0153649 | A1 * | 7/2006 | Folstadt, Jr. | B65G 53/58 | 406/144 |
| 2010/0040422 | A1 * | 2/2010 | Charhut | B65G 53/10 | 406/108 |
| 2012/0061206 | A1 * | 3/2012 | Furuyama | B65G 47/19 | 198/540 |
| 2015/0296703 | A1 * | 10/2015 | Audigie | A01C 7/081 | 222/637 |
| 2016/0050843 | A1 * | 2/2016 | Roberge | B65G 53/16 | 406/122 |
| 2016/0368721 | A1 * | 12/2016 | Haraway | B65G 69/188 | |

* cited by examiner

DROP CHUTE DEFLECTOR FOR ENHANCING ENTRAINMENT OF GRANULAR PRODUCT IN AN AIRSTREAM OF AN AGRICULTURAL PRODUCT APPLICATOR

FIELD OF THE INVENTION

The present invention pertains to agricultural equipment and, more specifically, to an agricultural product delivery system in an agricultural implement, such as a planter or fertilizer applicator, that utilizes a flow of pressurized air for conveying and applying substantially granular agricultural products and particulate materials such as seed, fertilizer, herbicide or insecticide to a ground surface, or for placing such products and materials into the soil.

BACKGROUND OF THE INVENTION

Agricultural product delivery systems are known to utilize various mechanisms, including mechanical and pneumatic systems to move particulate material or product, such as fertilizer, seed, insecticide or herbicide, from a product supply chamber, through a series of elongate tubes that extend from a product supply chamber to a product applicator, and placing the product on, or in growing medium, such as soil. Such agricultural product delivery systems are commonly employed in planters, air drills, fertilizer and pesticide applicators and a variety of other agricultural implements.

Agricultural implements that employ such an agricultural product delivery system are known to have a particulate material supply source such as one or more tanks that are loaded with the particulate material or materials to be applied. The tanks have or are associated with a metering device, which typically consists of a rotating element, which meters the particulate materials from the tanks into a set of distribution channels, such as conduits, hoses, etc., for application to the farm field. In most systems, a pneumatic source such as a fan or blower provides air to convey and distribute material through the distribution channels. Once the metering of particulates is done and the mix of air and particulates is in the distribution channels, the solid concentration should remain nearly constant and fully entrained in dilute phase.

Systems as described have provided certain advantages and have worked acceptably in some aspects, but are not without disadvantages, inefficiencies or inconveniences. For example, it is desirable to use a material supply source, such as a tank, with different applicator equipment, for example, by coupling the tanks with a planter for planting seed, and later coupling the same tank equipment with an applicator for applying needed pesticides and/or fertilizer. This has been difficult due to the necessary metering systems for applying the different materials. With the metering device provided on the tank, it is necessary to adjust the metering device whenever the tank is used for supplying a different material. This can be time consuming and inconvenient if the metering device is underneath the tank.

While the use of a metering system can effectively distribute the different particulate material to the various distribution channels and nozzles of the applicator, the metering system itself is a complex mechanism that must be accurately operated in order to effectively distribute the particulate matter to each nozzle and to accommodate for operational changes including additional particulate material(s) to be dispensed and turning compensations, among others.

Further, the prior art metering systems suffer from issues with regard to the ability of the metering systems to separately meter multiple particulate materials into a plurality of distribution channels and to reduce any interference of pneumatic air flow through the distribution channels with the metering of the particulate materials by the metering systems.

In addition, once the proper proportion of the particulate material is metered into the distribution channels, it is necessary to get the material evenly entrained into the flow of air through the distribution channels and deliver it to the discharge nozzles in a constant, even flow without interruptions in either the flow of particulate material or the air carrying the entrained particulate material.

It is desirable, therefore, to provide an improved agricultural product conveying system that enhances operational efficiency and convenience of the applicator without complicating its construction.

SUMMARY OF THE INVENTION

The invention provides a granular product delivery arrangement and method for an agricultural product applicator, that utilize a granular product deflector disposed below an inflow slot in a substantially horizontally extending supply line for enhancing entrainment of the granular product in an air stream passing through the supply line. The deflector has a body configured for enhancing entrainment of the granular product dropped through the inflow slot into the flow of pressurized air passing through the supply line. The body of the deflector is configured for directing the granular product away from a central area of the supply line and toward an inside wall of the supply line, and/or for directing the air stream away from the inflow slot in a manner that maintains a substantially unobstructed path for the airstream through the central area of the supply line. The deflector provides at least one enhanced mixing zone at an interface between the air stream and the granular product within the supply line so that the granular product is effectively and efficiently entrained into the air stream.

In one form of the invention a granular product delivery arrangement is provided for an agricultural product applicator having a granular product supply compartment and a granular product delivery unit for dispersing granular product from the supply compartment to a ground surface. The granular product delivery arrangement includes a substantially horizontally extending supply line and a granular product deflector operatively disposed in the supply line. The substantially horizontally extending supply line has a tubular wall defining an inside surface and a longitudinal axis of the supply line. The supply line also has an upstream end adapted for receiving a flow of pressurized air from a source of pressurized air, and a downstream end operatively attached to the granular product delivery unit.

The supply line further defines an inflow slot extending through an upper surface of the wall of the supply line. The inflow slot has a length extending along the longitudinal axis of the supply line from an upstream end to a downstream end of the inflow slot and is configured for dropping granular product from the supply compartment into the supply line to be entrained in the flow of pressurized air passing through the supply line.

The deflector has a body operatively attached below the inflow slot in the supply line and configured for enhancing entrainment of the granular product dropped through the inflow slot into the flow of pressurized air passing through the supply line.

In some forms of the invention, the body of the deflector may include an air baffle that is disposed in the supply line adjacent the upstream end of the inflow slot in the wall of the supply line. The air baffle may be configured for directing and accelerating the flow of pressurized air away from the inflow slot toward the interior of the supply line, and/or toward the inside wall of the supply line.

In embodiments of the invention where the granular product applicator has one or more granular product compartments and the wall of the horizontally extending supply line defines two or more longitudinally spaced and aligned, longitudinally extending inflow slots operatively connected to receive granular product from one or more of the granular product compartments, the deflector body may extend below at least two of the inflow slots in the supply line and be configured for enhancing entrainment of the granular product dropped through those at least two inflow slots into the flow of pressurized air passing through the supply line.

In some forms of the invention, the body of the deflector may be spaced at a distance below the inner surface of the supply line.

The body of the deflector may be configured to direct the granular product dropping into the supply line toward the inside surface of the wall of the supply line. The body of the deflector may be further configured for dividing the granular product dropping into the supply line through the inflow slot into at least a first and a second stream of the granular product and directing the first and second streams of granular product in opposite directions toward and/or along the inner surface of the wall of the supply line.

The body of the deflector may be configured to extend in the longitudinal direction and include at least first and second downwardly directed guide surfaces flaring outwardly from the inflow slot in the supply line toward opposite sides of the inner surface of the wall of the supply line, for dividing the granular product dropping into the supply line through the inflow slot into at least a first and a second stream of the granular product, and directing the first and second streams of granular product in opposite directions toward the inner surface of the wall of the supply line. In some forms of the invention, the body of the deflector may have an inverted V-shape, with a vertex of the inverted V-shape pointing upward toward the inflow slot and extending in a substantially longitudinal direction.

In some forms of the invention, the body of a deflector may be spaced at a distance below the inner surface of the supply line and configured for directing the granular product dropping into the supply line along the inner surface of the wall of the supply line, and further include an air baffle disposed in the supply line adjacent the upstream end of the inflow slot in the wall of the supply line, with the baffle being configured for directing and accelerating the flow of pressurized air away from the inflow slot toward the interior of the supply line, and/or toward the inside surface of the supply line. The body of the deflector, in such forms of the invention, may also extend in the longitudinal direction and include at least first and second downwardly directed guide surfaces flaring outwardly from the inflow slot in the supply line toward opposite sides of the inner surface of the wall of the supply line, for dividing the granular product dropping into the supply line through the inflow slot into at least a first and a second stream of the granular product, and directing the first and second streams of granular product in opposite directions toward or along the inside surface of the wall of the supply line.

The invention may also take the form of an agricultural product applicator having a granular product supply compartment, a granular product delivery unit for dispersing granular product from the supply compartment to a ground surface, and a granular product delivery arrangement, according to the invention, that includes a substantially horizontally extending supply line and a granular product deflector disposed in the supply line.

The invention may further take the form of a method for enhancing granular product delivery in an agricultural product arrangement having a substantially horizontally extending supply line including a tubular wall defining an inside surface and a longitudinal axis of the supply line, and an inflow slot extending through an upper surface of the wall of the supply line and configured for dropping granular product into a flow of pressurized air flowing through the supply line to be entrained in the flow of pressurized air passing through the supply line. Such a method may include operatively disposing a granular product deflector below the inflow slot in the substantially horizontally extending supply line for enhancing entrainment of the granular product in an air stream passing through the supply line.

A method according to the invention may also include configuring the deflector to have a body that enhances entrainment of the granular product dropped through the inflow slot into the flow of pressurized air passing through the supply line by directing the granular product toward an inside wall of the supply line, and directing the air stream away from the inflow slot in a manner that maintains a substantially unobstructed path for the airstream through a central area of the supply line and provides at least one entrainment zone within the supply line for the granular product to be entrained into the air stream.

Other aspects, objects and advantages of the invention will be apparent from the following detailed description and accompanying drawings of exemplary embodiments.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
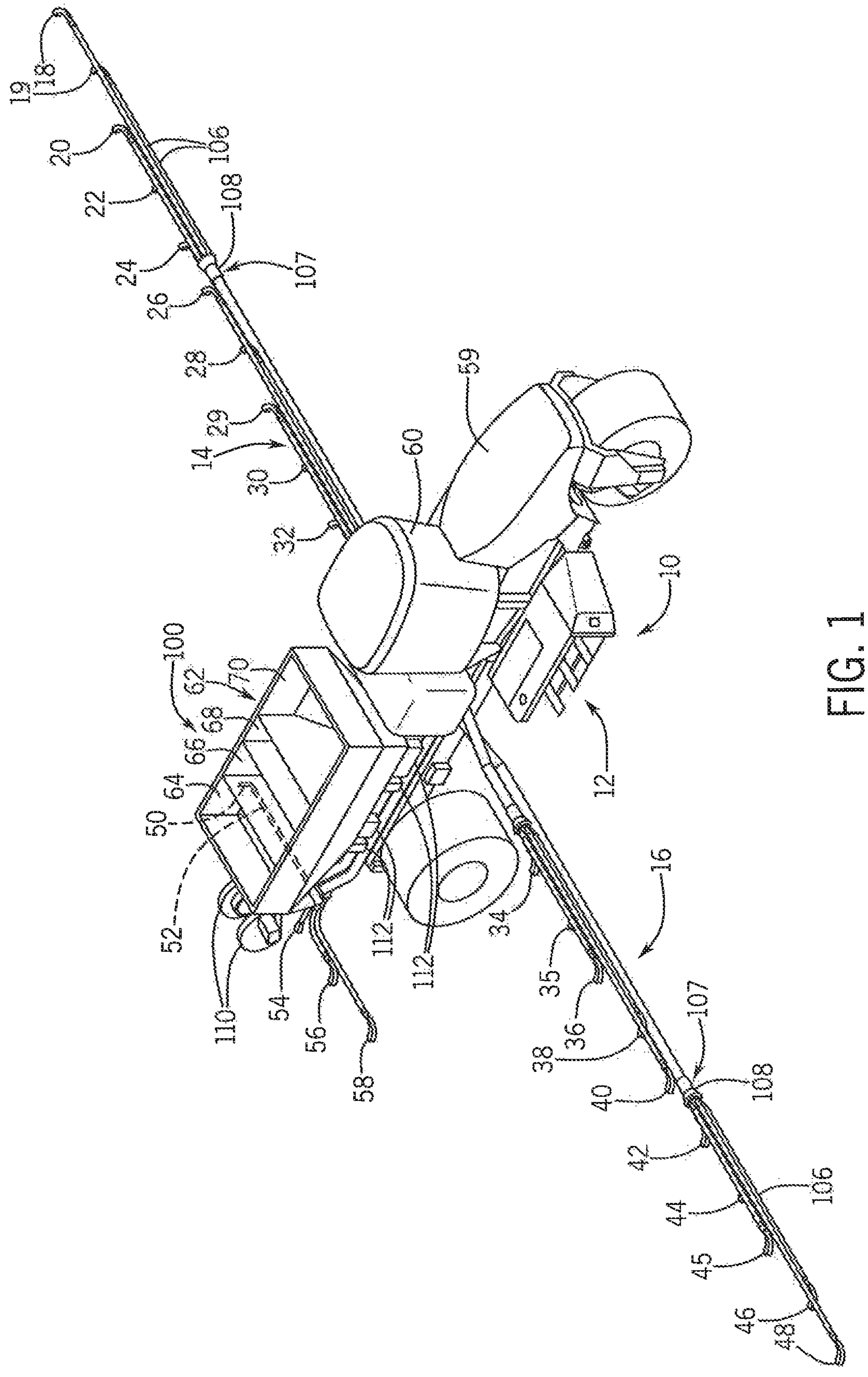
FIG. 1 illustrates an isometric view of an exemplary embodiment of an agricultural application implement in the form of a fertilizer spreader, comprising a conveying system in accordance with an exemplary embodiment of the present invention.
Figure 2:
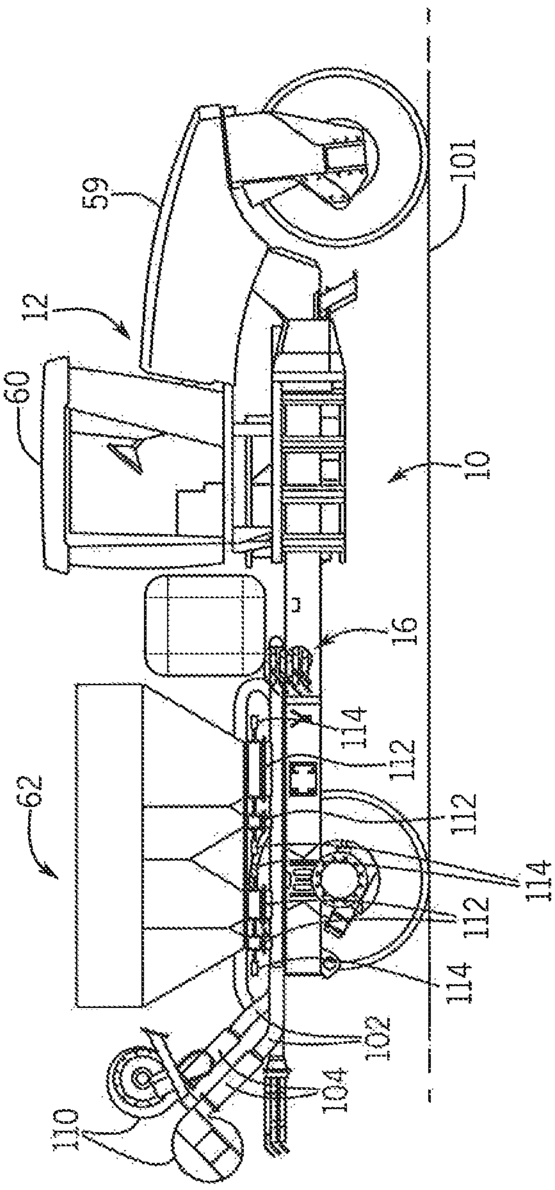
FIG. 2 illustrates the side elevation view of the fertilizer spreader of FIG. 1, in accordance with an exemplary embodiment of the present invention.
Figure 3:
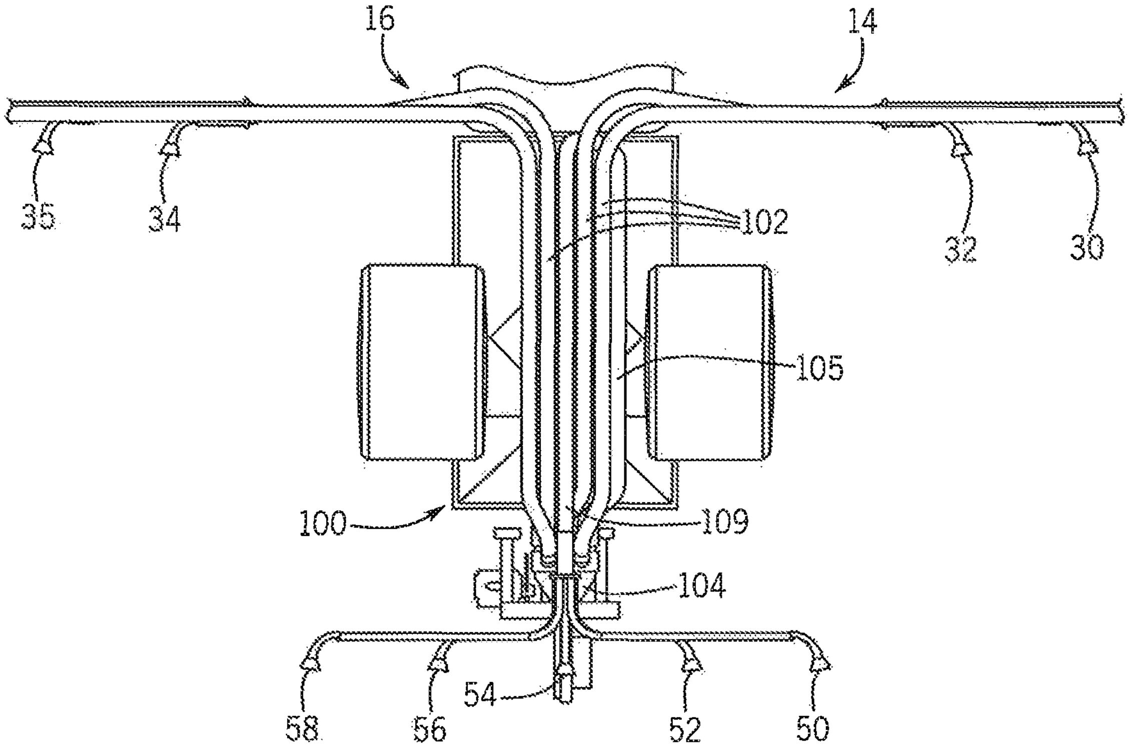
FIG. 3 illustrates the bottom plan view of the conveying system in accordance with an exemplary embodiment of the present invention.

Referring now to the drawings, and more particularly to FIGS. 1-3, there is shown an agricultural application implement 10, on which a pneumatic conveying system 100 can be used. In the exemplary embodiment shown, application implement 10 is a granular fertilizer applicator 10. As is known in the art, applicator 10 generally includes a large tired transport unit 12 such as truck or tractor, and laterally extending particle delivery booms 14 and 16, which may be pivoted to a stowed position close to the implement for storage or transport. Each boom 14, 16 includes a plurality of boom tubes or conduits terminating at the outboard end in a particle delivering unit, which for the fertilizer applicator 10 are spreading outlets or nozzles. In the exemplary embodiment shown, boom 14 includes ten nozzles 18, 19, 20, 22, 24, 26, 28, 29, 30 and 32; and boom 16 includes ten nozzles 34, 35, 36, 38, 40, 42, 44, 45, 46 and 48. Additionally, at the back of applicator 10 there are five rear nozzles 50, 52, 54, 56 and 58 to provide full and complete coverage across the width of implement 10, including the area between the inboard-most nozzles 32 and 34 of booms 14, 16. Implement transport unit 12 is self-propelled by an engine in an engine compartment 59 and includes an operator cab 60. In the exemplary embodiment shown, an uncovered tank 62 includes compartments 64 and 70 for carrying particulate material to be distributed to and disbursed by nozzles 18-58. Further smaller compartments 66 and 68 are provided to supply micro-nutrients or other materials to nozzles 18-58. The supply of particulate in compartments 64, 66, 68, 70 is replenished periodically from a supply vehicle (not shown).

Fertilizer applicator 10 is illustrative of the types of equipment for which the conveying system 100 can be used; however, it should be understood that the conveying system 100 may, of course, be employed in conjunction with other agricultural equipment such as tillage, seeding or planting devices, and is useful in distributing particulate material other than fertilizer.

Looking now at FIGS. 1-3, in the illustrated exemplary embodiment the compartments 64-70 of the tank 62 are each disposed directly above the conveying system or assembly 100, which is a pneumatic conveying system 100. The system 100 includes five large diameter supply lines 102 that extend from a plenum 104 at one end, under the compartments 64-70 and terminate at the booms 14, 16 or at the rear nozzles 50-58. At the booms 14, 16, the supply lines 102 and the particulate material or product transported therein are split by a suitable distribution structure or mechanism 107, such as a plurality of horizontal rotary distributors 108, among or into a number of secondary or smaller supply lines 106 that are connected to the nozzles 18-58.

To collect and drive the particulate material along the lines 102, in the illustrated embodiment one or more fans 110 are operably connected to the plenum 104 opposite the inlet ends of lines 102. The air flow from the fans 110 is directed from the fans 110 through the plenum 104 and into the respective lines 102 as a result of the structure of the plenum 104. After the air flow passes through the plenums 104 connected to the fans 110 and collects/entrains the particulate material from the compartments 64-70 in a manner to be described, the air flow continues to flow along each of four (4) of the large diameter supply lines 102 that make approximately a 90° turn to connect to the booms 14, 16.

In order to spread the particulate material/product over/onto the center section over which the machine 10 passes, a large line 102 must move product to the rear nozzles 50-58 where there is no interference by the machine 10 on the spread pattern. To accomplish this a line 102 carrying only air is added on the side of the machine 10 and has a forward section 105 that extends from the plenum 104 to the front of the machine 10. At the front of the machine 10, the line 102 turns 180° and has a rearward section 109 that passes beneath the compartments 64-70 where the line 102 collects the particulate material/product and transports the product to the nozzles 50-58 at the rear of the machine 10.

In an alternative exemplary embodiment, it is contemplated that the conveying system 100 can be formed, in addition to or as a substitute for the pneumatic system 100, with one or more mechanical conveyors (not shown) taking the form of one or more augers (not shown) that are disposed within the lines 102 and encircle the auger(s) along their length. The augers are each operably connected to a motor (not shown) that causes the augers to rotate within the respective lines 102, moving the particulate material in conjunction with the air flow through the lines 102. The operation of the motor can be controlled to control the speed of rotation of the augers, either collectively or independently from one another, such that the speed of the conveying system 100 can be varied as desired but not to meter the product(s).

Figure 4:
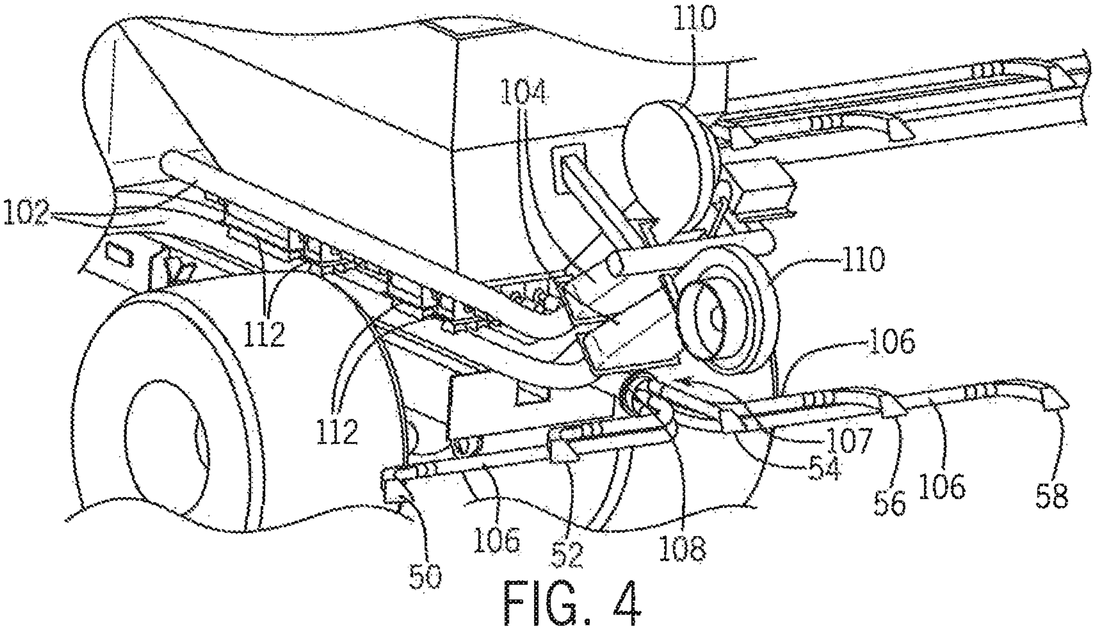
FIG. 4 illustrates a rear isometric view of an exemplary embodiment of the conveying system on a fertilizer spreader in accordance with an exemplary embodiment of the present invention.

Looking now at FIGS. 1, 2 and 4, in the illustrated exemplary embodiment the plenums 104 provide airflow from the fans 110 to all five supply lines 102 of the system 100, with one plenum 104 connected to the two (2) outside lines 102, with the other plenum 104 supplying the air flow to the center three (3) lines 102. The lines 102 are split in this fashion because of the higher-pressure drop associated with the outermost lines 102 as a result of their length. With only the two higher pressure lines supplied by one plenum 104, it allows the fan 110 connected to the longer lines 102 to supply a higher-pressure airflow through these lines 102 since less airflow is required for two lines 102 vs three lines 102. In the illustrated exemplary embodiment, the two fans 110 and associated plenums 104 are stacked vertically with respect to one another. However, a different configuration can be utilized where the fans 110 and plenums 104 are arranged in the same horizontal plane in order to minimize the space requirements, with the plenums 104 also optionally being rotated 90° from the illustrated configuration.

Referring now to FIGS. 4-13, in the illustrated exemplary embodiment the particulate material/product contained within each of the compartments 64-70 of the tank 62 is introduced into the airflow in the various lines 102 via an airtight inline product metering system 11, that is formed of a number of metering devices 112 that function to meter the product flowing from the compartments 64-70 into each line 102.

Figure 5:
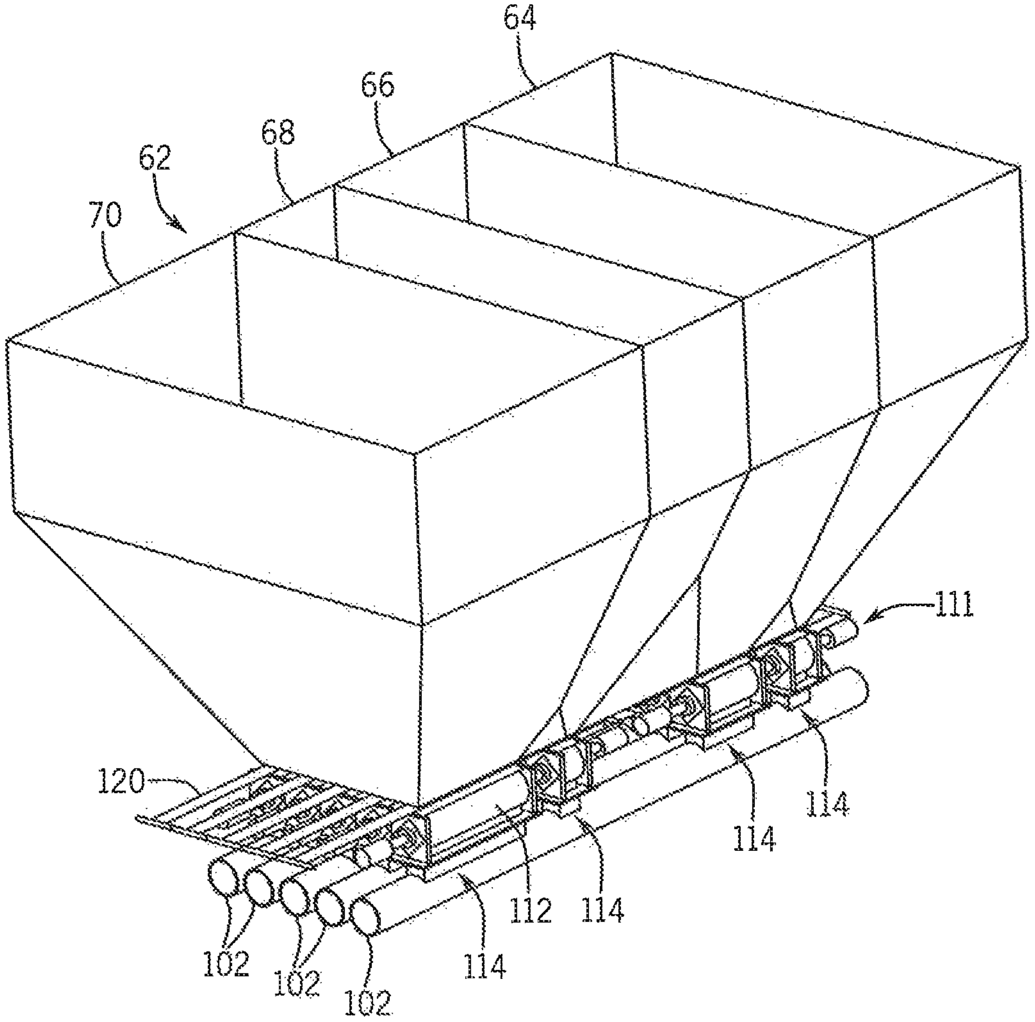
FIG. 5 illustrates an isometric view of a tank and inline metering system in accordance with an exemplary embodiment of the present invention.
Figure 6:
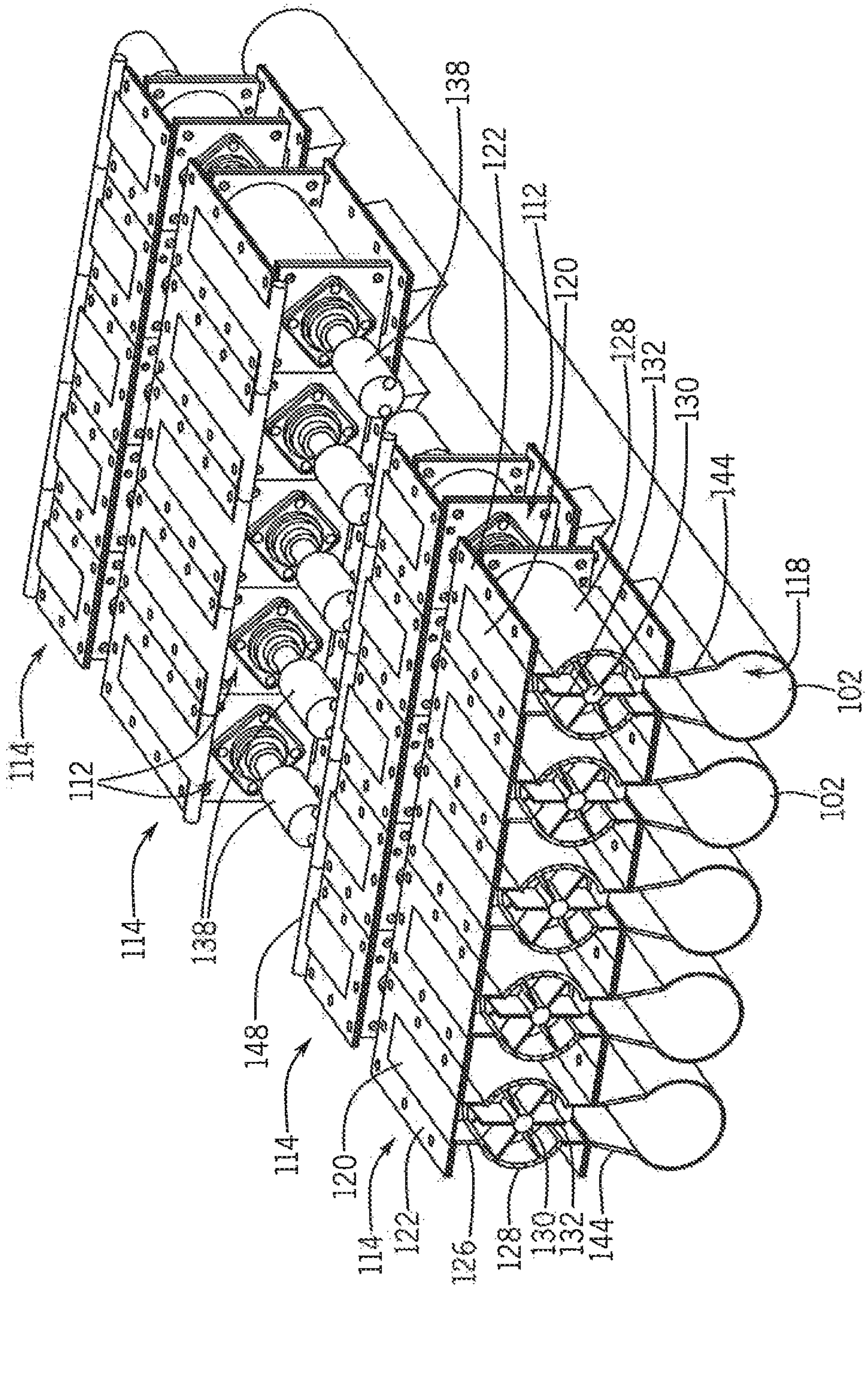
FIG. 6 illustrates a partially broken away, isometric view of the inline metering system of FIG. 5, in accordance with an exemplary embodiment of the present invention.

In the exemplary embodiment of FIGS. 5 and 6, the metering devices 112 forming the inline metering system 111 are disposed in sets 114 located directly beneath each compartment 64-70 of the tank 62, with each set 114 of metering devices 112 associated with one compartment 64-70 of the tank 62. The metering devices 112 are connected in alignment with apertures 116 formed in the compartments 64-70 to enable particulate material to enter the metering devices 112. The metering devices are also aligned with openings, in the form of inflow slots 118 in the lines 102 to enable the particulate material to be dispensed from the metering devices 112 into the lines 102. The number of metering devices 112 forming each set 114 corresponds to the number of lines 102 in the conveying system 100, such that the particulate material from each compartment can be dispensed into each line 102 utilizing the same set 114 of metering devices 112.

In addition, in the illustrated exemplary embodiment, while the width of the metering devices 112 in each set 114 is the same in order to correspond to the size of the lines 102, the length of the metering devices 112 in each set 114 is dependent of the size of the compartment 64-70 associated with the set 114, and/or tank and the type of particulate material held within that compartment 64-70. For example, the larger compartments 66, 70 of the tank 62 can contain urea that will be metered at a higher rate per acre, thus requiring longer metering devices 112 in the set 114 associated with the compartments 66, 70 to avoid excessive operational speeds for the metering devices 112. In contrast, smaller compartments 66, 68 are configured to retain micronutrients therein, such as zinc, for example, which are normally spread at a lower rate per acre, and thus have smaller metering devices 112 in the sets 114 associated with these compartments 64, 68. The positioning of compartments 64-70 of different sizes within the tank 62 is selected to avoid physical interference between the operating parts of the metering devices 112 and could be in any order, large or small compartments.

Figure 12:
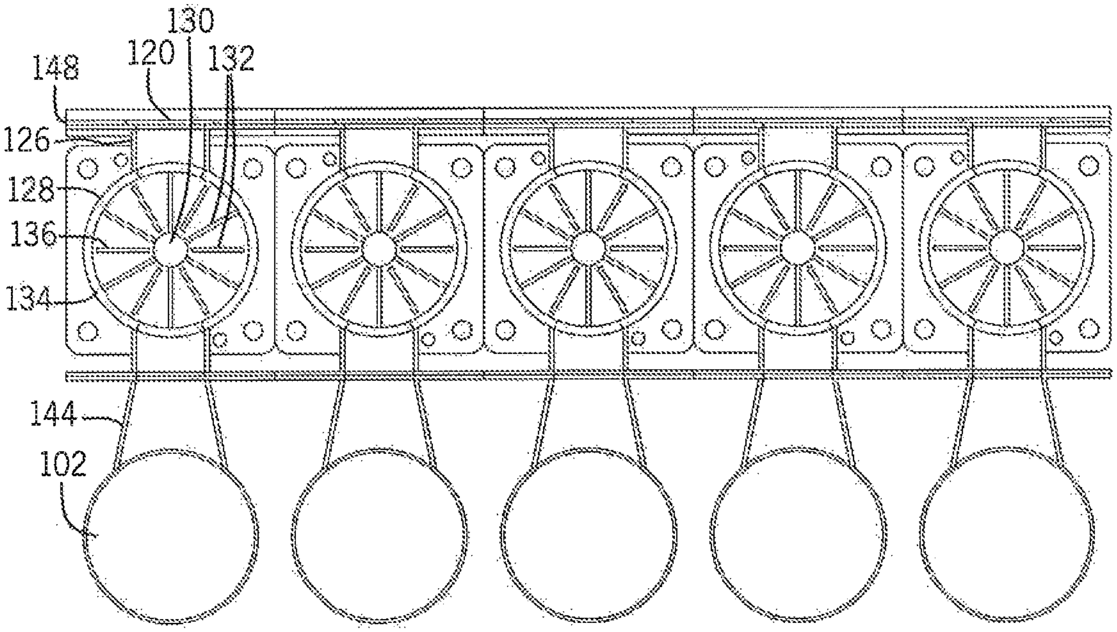
FIG. 12 illustrates a cross-sectional view of the inline metering system of FIG. 6, in accordance with an exemplary embodiment of the present invention.

Looking now at FIGS. 6, 7 and 12, the metering devices 112 are each formed with a gate 120 that is slidably disposed within a guide 122 that is secured to the tank 62 below the compartment 64-70 associated with the metering device 112. The gate 120 selectively covers an inlet opening 124 defined within the guide 122 that is aligned with a discharge aperture (not shown) in the adjacent compartment 64-70 and that communicates with an optionally flared or straight inlet channel 126 that extends downwardly from the guide 122. The inlet channel 126 is connected to and communicates with the interior of a housing 128 for a rotating shaft 130. The shaft 130 includes a number of radially extending paddles 132 thereon. The paddles 132 can be positioned on the shaft 130 in any suitable configuration, and in the illustrated exemplary embodiment are positioned equidistant from one another around the circumference of the shaft 130. The paddles 132 extend towards the housing 128 with a very small space 134 (FIG. 12) left between the outer edge 136 of the paddle 132 and the housing 128 in order to prevent particulate material from falling directly through the metering device 112 and prevent or limit the flow of pressurized air from the lines 102 upwardly through the metering device 112 and into the compartments 64-70 by forming a somewhat airtight seal between the paddles 132 and the housing 128. If paddles 132 are non-metallic, they can have an interference fit with housing 128 to make a better air seal.

Figure 7:
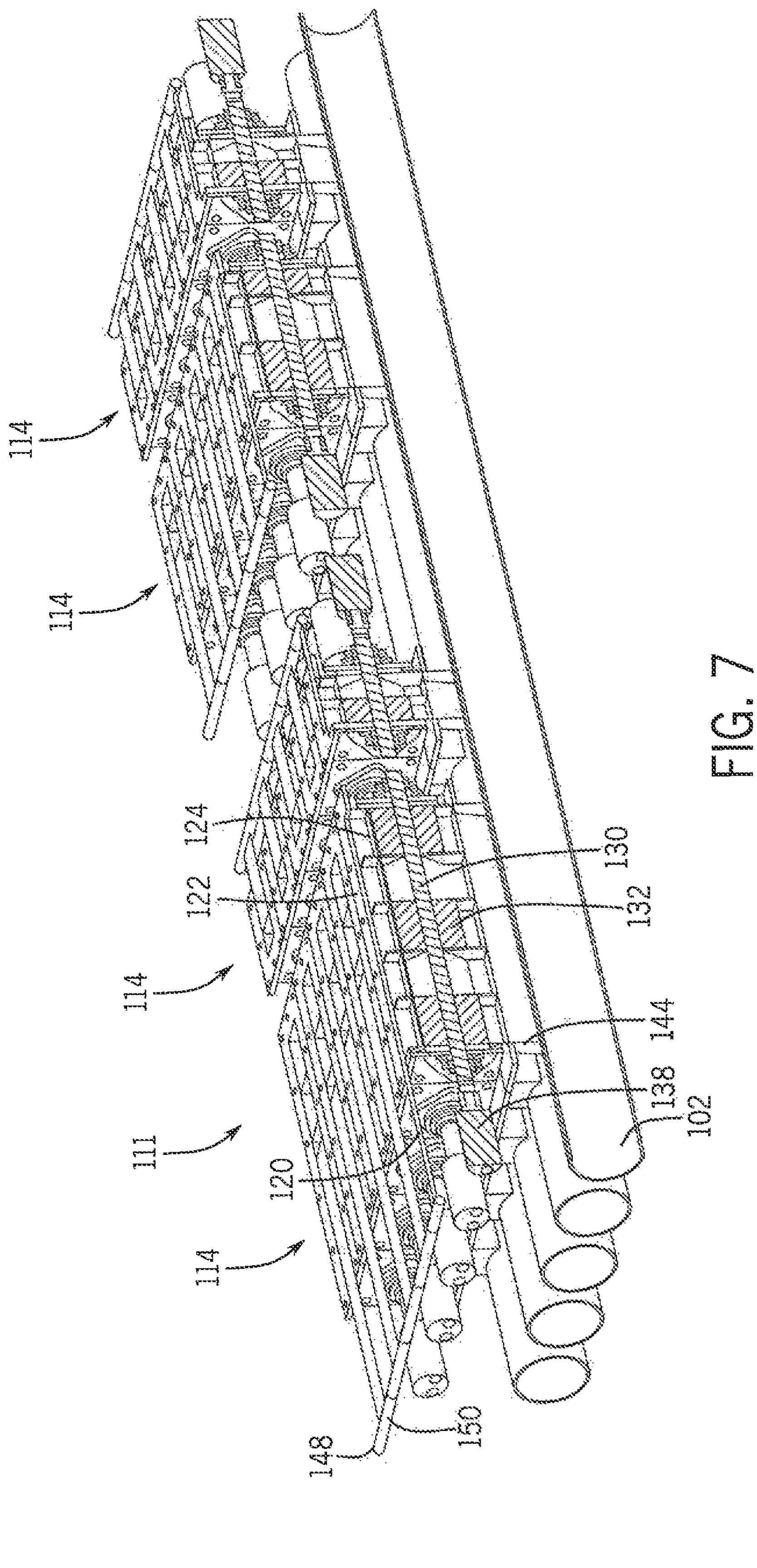
FIG. 7 illustrates a partially broken away, isometric view of the inline metering system of FIG. 6, in accordance with an exemplary embodiment of the present invention.
Figure 8:
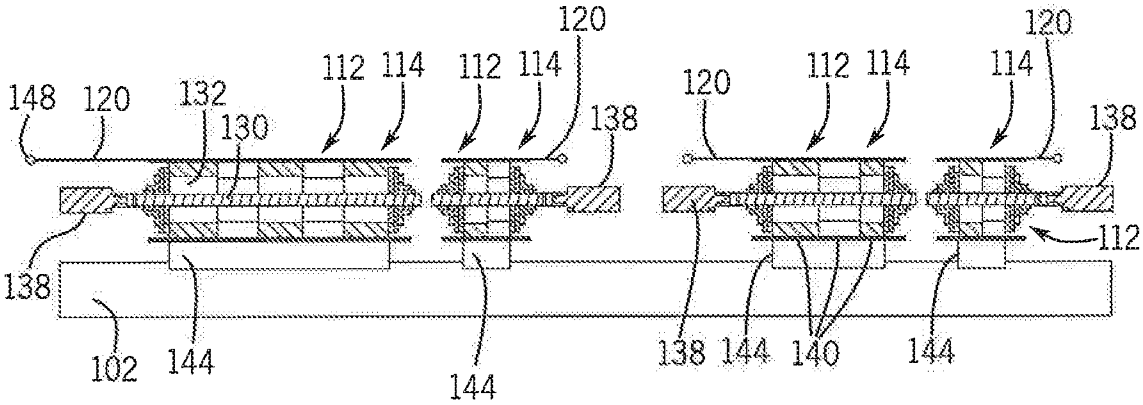
FIG. 8 illustrates a side elevational view of the inline metering system of FIG. 6 in a first configuration, in accordance with an exemplary embodiment of the present invention.
Figure 13:
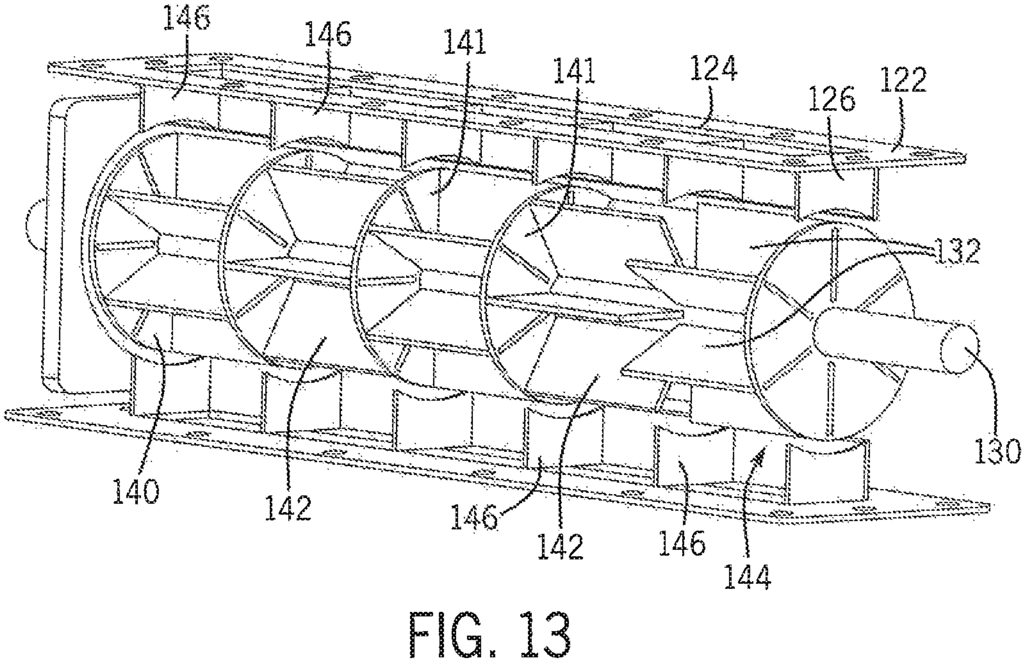
FIG. 13 illustrates an isometric view of the rotary shaft of the inline metering system of FIG. 6, in accordance with an exemplary embodiment of the present invention.

With reference now to FIGS. 7, 8 and 13, in metering devices 112 for different sets 114, the length of the device 112 can vary the number and positioning of the paddles 132 present on the shaft 130. For example, while the metering device 112 associated with the largest compartment 70 has equal sized paddles 132 disposed across the shaft 130, the devices 112 associated with the compartment 64-68 have paddles 132 of different sizes disposed on the shaft 130 to accommodate for the length of the shaft 130. Further, as best shown in FIG. 13, the metering device 112 can be formed with multiple segments 140, each segment 140 being defined by circular separator plates 141, that are formed with a close tolerance to the housing 128 similar to paddles 132 and including paddles 132 that are offset by thirty (30) degrees to create pockets 142 between the paddles 132 of sixty (60) degrees. The pockets 142 can be offset to lower the torque variation during operation of the shaft 130 as well as reducing the product pulsing effect at lower rotational speeds. Other angles and/or number of paddles 132 may be used. Other spacings, and/or variable spacings of separator plate/divider 141 may also be used.

The shaft 130 is operably connected to a motor 138, such as an electric or hydraulic motor, that operates to rotate the shaft 130 and the paddles 132 within the housing 128 at the desired speed to meter the flow of the particulate material through the metering device 112 into the line 102. In an alternative embodiment, the motor 138, or a separate motor/actuator (not shown), is additionally operably connected to the gate 120 in order to selectively open or close the gate 120 relative to the guide 122, thus controlling the flow of particulate material into the metering device 112 from the compartment 64-70.

Below the shaft 130, the housing 128 is connected to a discharge channel 144 that extends between the housing 128 and the line 102. In the illustrated exemplary embodiments of FIGS. 6, 12 and 13, the discharge channel 144 can be formed to be straight or to optionally flare outwardly as it extends away from the housing 128 in order to enable the particulate material discharged through the channel 144 to be move evenly distributed into the line 102. Further, as best shown in the exemplary embodiment of FIG. 13, the channel 144 can contain baffles 146 therein that extend across the discharge channel 144 and are disposed any angle from ninety (90) degrees to forty-five (45) degrees to deflect the flow of particulate material and mix it more smoothly with the air flow in the line 102 as well as with other particulate materials metered from an upstream compartment 64-70. The baffles 146 can also be present in the inlet channels 126, as shown in the exemplary illustrated embodiment of FIG. 13. Other devices can be placed in discharge channel 144 that may aid in material dispersion as it flows into line 102.

Figure 9:
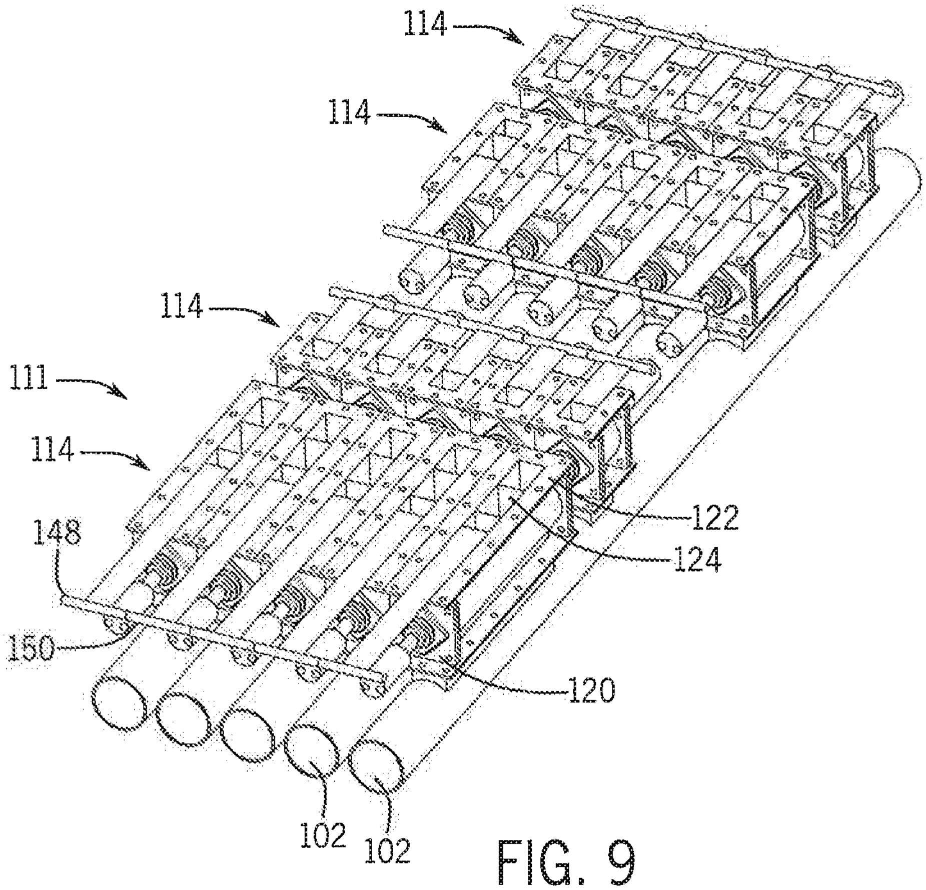
FIG. 9 illustrates an isometric view of the inline metering system of FIG. 8 in a first configuration, in accordance with an exemplary embodiment of the present invention.
Figure 10:
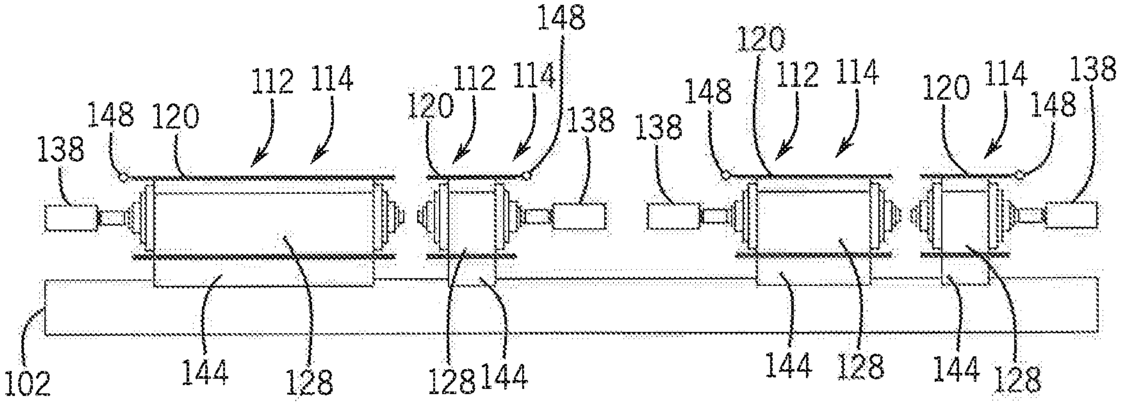
FIG. 10 illustrates a side elevational view of the inline metering system of FIG. 6 in a second configuration, in accordance with an exemplary embodiment of the present invention.
Figure 11:
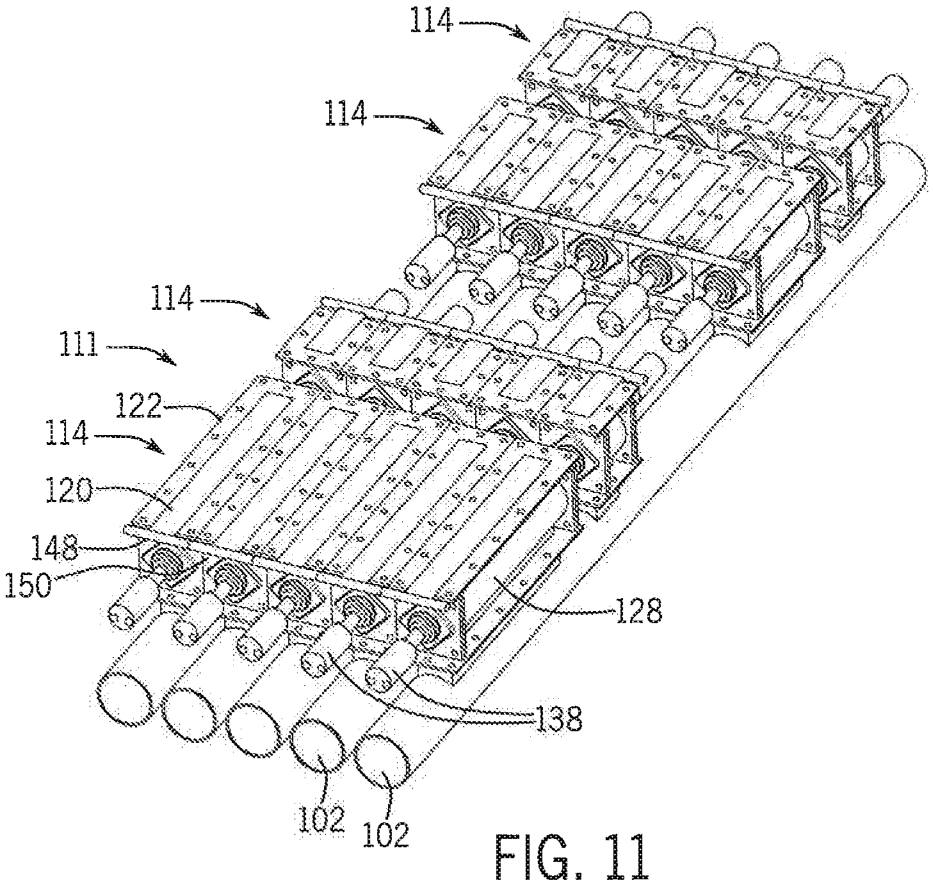
FIG. 11 illustrates an isometric view of the inline metering system of FIG. 10 in the second configuration, in accordance with an exemplary embodiment of the present invention.

With reference now to FIGS. 8-11, in operation, initially the metering system 111 is in the configuration of FIGS. 10 and 11, where the gates 120 are all in the fully closed position to completely cover the openings 124 in the guides 122. To begin to dispense the particulate into the metering system 111, the gates 120 for each set 114 of metering devices 112 are moved outwardly from the closed position, as shown in FIGS. 8 and 9. In the illustrated exemplary embodiments, the gates 120 all include a handle 148 opposite the guide 122 that can be grasped to manually slide the gate 120 relative to the guide 122. Further, the handles 148 for the gates 120 in each set 114 can be interconnected via a linkage 150, such that the gates 120 in each set 114 can be moved in unison to provide identical dispensing of the particulate material through the metering devices 112 within the set 114 into the lines 102 connected with each device 112. Depending upon the desired application rate for the material to be dispensed from each compartment 64-70, the gates 120 for the metering devices 112 in the associated set 114 can be adjusted to provide the desired flow of particulate material from the individual compartments 64-70 into the metering devices 112 to provide the desired flow rate into the lines 102. For example, as illustrated in the exemplary embodiment of FIG. 7, the gates 120 are partially opened to enable the operator to run the system 111 with the metering devices 112 at higher rotational speeds and using only a few sections, instead of operating with all gates opened for a given series of five sets 114 on the same tank 62 that would run at slower speed in order to eliminate possible material pulsing in the airstream. In addition, each metering device 112 in each set 114 can run independently at various speeds to allow sectional control, and the gates 120 for each set 114 can be disposed at or between the fully opened (FIG. 8) or fully closed (FIG. 10) positions independently of any other gates 120 for the sets 114 associated with other compartments 64-70. This allows different operating configurations for the gates 120 to be set when the inline metering system 111 is utilized to supply the conveying system 100 with the various types of fertilizers (such as urea, potash, etc.) seeds (such as canola, wheat, etc.) and micro-nutrients (such as zinc, manganese, potassium, sulfur, etc.) for different utilizations of the applicator 10.

In addition to the use of the gates 120 to control the flow of particulate materials into the metering devices 112, other purposes or uses of the gates 120 include: closing the gates 120 to perform maintenance on the metering device 112 in such a manner that the gates 120 preclude particle dripping; closing the gates 120 to seal the bottom of any compartment 64-70 when not needed or in use to avoid air flow leakage from the metering device 112 into the compartments 64-70; adjusting the position of the gates 120 within the guides 112 to control the size of the longitudinal opening 124 to synchronize the rotational speed of the metering devices 112 to obtain the proper rate; and, closing the gates 120 to keep the bottom of the compartments 64-70 clean by moving the gates 120 over the top of the metering devices 112 to push any extra particulate material out of the compartment and into the metering device 112.

It will be appreciated by those having skill in the art that, although the conveying system 100 having the inline metering system 111 has been described herein primarily with respect to pneumatic and/or mechanical fertilizer application equipment or applicator commonly referred to as a “floater”, it should be understood that the advantages of the conveying system 100 including the inline metering system 111 disclosed herein can be obtained on other types of equipment for applying particulate materials in a field. Planters of various types are known to include an applicator unit, such as a drill or seeder, and may include an air cart having one or more bulk tanks carrying fertilizer and/or seeds to be planted. The conveying system 100 including the inline metering system 111 disclosed herein can be provided on the planter, and one or more air/seed inductors on the air cart. If the air cart is then used with a planter of a different type, or with another type of particle application equipment, adjustments to the conveying system 100 including the inline metering system 111 can be made without the need to adjust the air/seed inductor assembly on the air cart. Accordingly, switching from one crop to another crop or from one planter to another planter does not require major adjustment of the air/seed inductor assembly on the air cart.

It will be further appreciated that by using a conveying system 100 as disclosed herein, a variety of materials can be applied by a variety of different implements. The particulate material to be applied is contained in one or more compartments. The particulate material or materials are supplied from the tanks to the conveying system 100 wherein the material or materials are conveyed to one or more particle injectors while being intermixed with one another. At the particle injector the conveyed product or products are provided in a metered flow and transferred to one or more particle delivery units, which can be a broadcast spreader, seeder for depositing seeds or other materials across a ground surface 101 the surface of soil, a row opener unit for depositing seeds or other material in rows, or the like.

Figure 14:
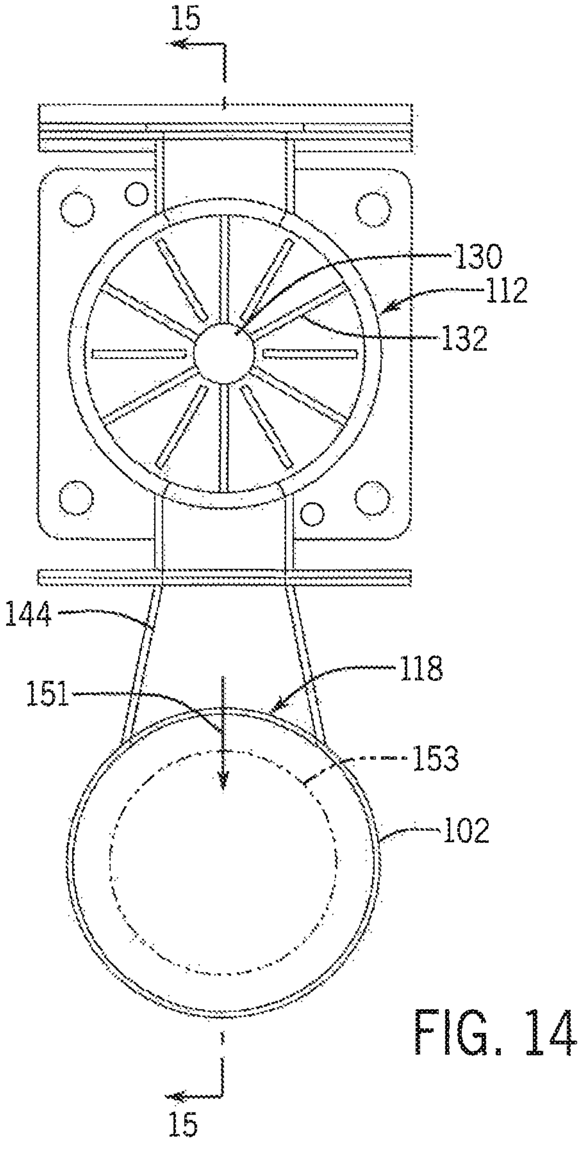
FIG. 14 illustrates an orthographic, diametric cross-section, taken along lines 14-14 in FIG. 15, of a supply line of the conveying system, in an exemplary embodiment of the implement of FIG. 1, showing an inlet slot in the supply line that does not utilize a deflector, in accordance with an exemplary embodiment of the present invention.
Figure 15:
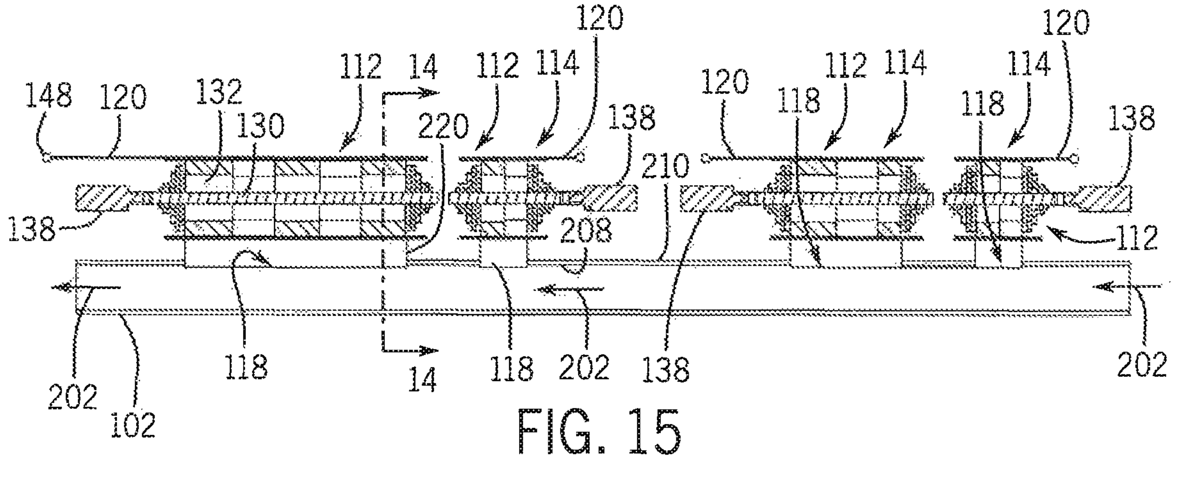
FIG. 15 illustrates an orthographic longitudinal cross-section of the supply line of FIG. 14, taken along lines 15-15 in FIG. 14, in accordance with an exemplary embodiment of the present invention.

As shown in FIGS. 14 and 15, when the exemplary embodiment of the pneumatic conveying system 100 described thus far above is operated with the sliding gate 120 opened, a substantially clear vertical path, as illustrated by arrow 151 in FIG. 14, is opened for a flow of granular of granular product to drop through the discharge channel 144 for entrainment into the flow of pressurized air 202, as shown in FIG. 15, in the supply line 102.

Figure 16:
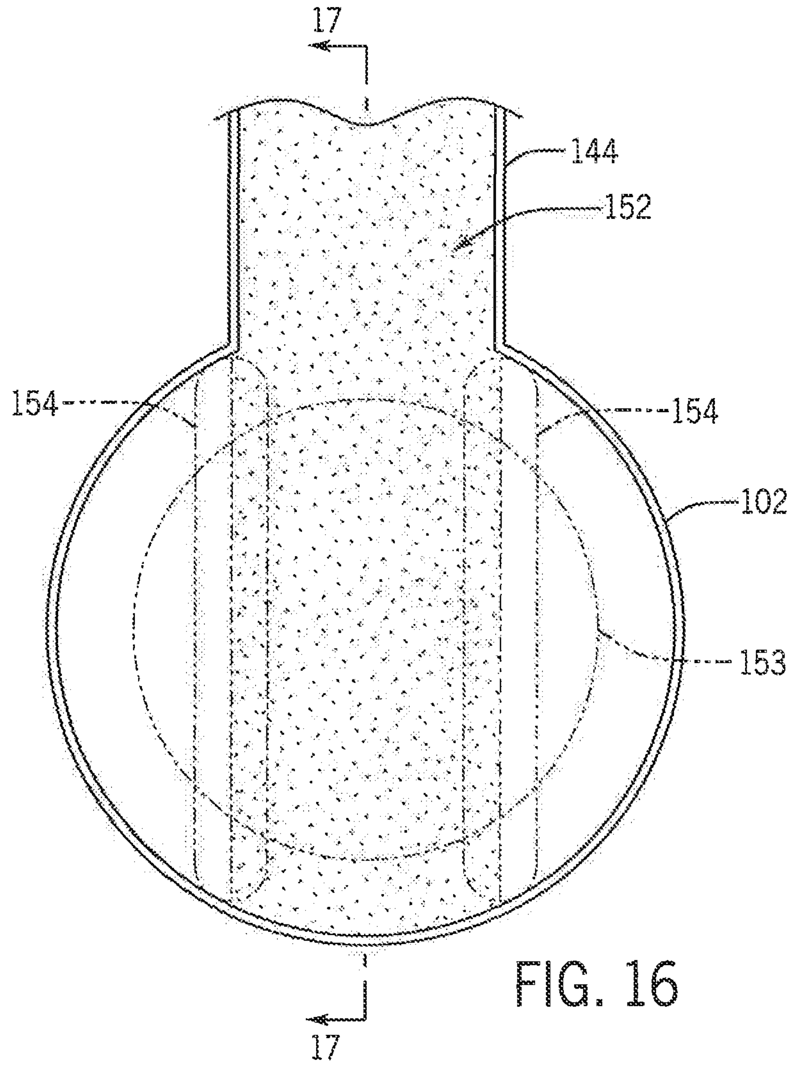
FIG. 16 illustrates an orthographic diametric cross-sectional diagram, taken along lines 16-16 in FIG. 17, of the supply line of FIG. 19, illustrating the manner in which a flow of granular product may enter the supply line of FIG. 14 from an inlet slot of the supply tube that does not utilize a deflector, in accordance with an exemplary embodiment of the present invention.
Figure 17:
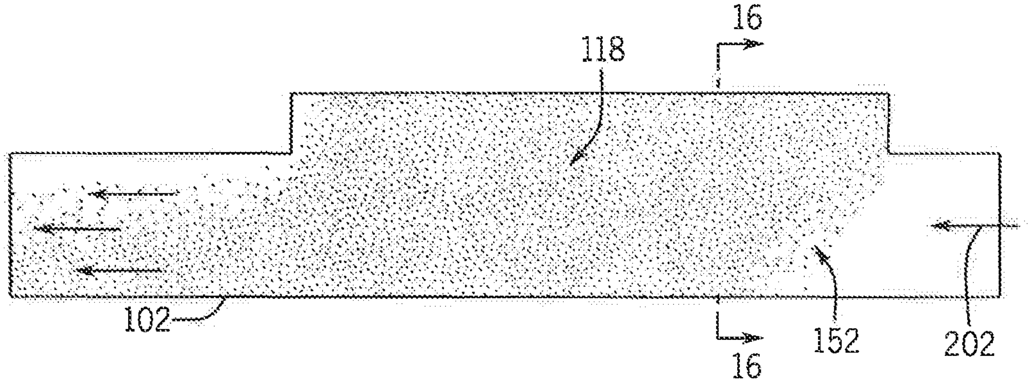
FIG. 17 illustrates an orthographic longitudinal cross-sectional diagram, taken along line 17-17 in FIG. 16, of the supply line of FIG. 14, illustrating the manner in which the granular product enters into a flow of air passing through the supply line, in accordance with an exemplary embodiment of the present invention.

As illustrated schematically in FIGS. 16 and 17, which correspond respectively to FIGS. 14 and 15, the flow of granular product initially forms a single stream 152 of granular product flowing substantially downward through a central area 153 of the supply line 102. The single stream 152 of granular product defines two entrainment zones 154,154 indicated by phantom lines in FIG. 19, extending respectively around and along the interfaces between the single stream 152 of granular product and the pressurized air flowing through the supply line 102. Because the single stream 152 of granular product generally drops diametrically across the central area 153, the entrainment zones 154,154 have a length substantially equal to slightly less than the diameter of the supply line 102. As the flow of pressurized air in the supply line 102 single stream 152 of granular product travels downstream in the supply line 102, the width of the single stream 152 expands to fill the interior of the supply tube 102, as the granular product is entrained at the entrainment zones 154,154 into the flow of air.

The efficiency and effectiveness of entrainment, mixing and delivery of the granular product through the supply tube is dependent upon the interaction of many factors, such as the density and other attributes of the granular product, the air flow rate and pressure, and physical factors such as the flow area and length of the supply line 102, the dimensions of the inflow slot 118, the degree to which the inflow slot 118 is open, and the rate at which the metering devices 112 are feeding the granular material into the discharge channel 144.

For many combinations of parameters such as those referenced in the preceding paragraph, the exemplary embodiment of the pneumatic conveying system 100 described thus far above provides highly efficient and effective delivery of a fully entrained flow agricultural product to the nozzles 18-58.

Experience has shown, however, that in some embodiments of the invention performance of the pneumatic conveying system 100 may be enhanced by adding a deflector 200 beneath one or more of the inflow slots 118, in a manner described in more detail below with reference to FIGS. 18 through 22.

Figure 21:
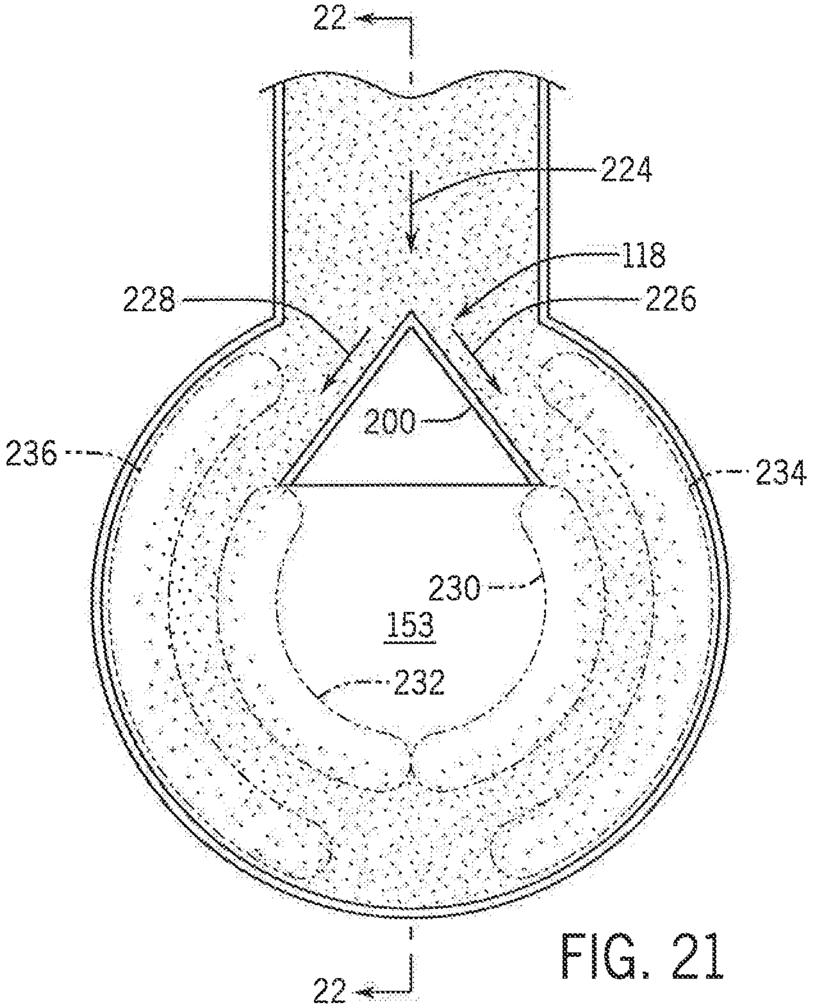
FIG. 21 illustrates an orthographic diametric cross-sectional diagram, taken along lines 21-21 in FIG. 22, of the supply line of FIG. 19, illustrating the manner in which the deflector divides and distributes a flow of granular product into the supply line to enhance entrainment of the granular product in a flow of air passing through the supply line, in accordance with an exemplary embodiment of the present invention.

Generally speaking, a deflector 200, according to the invention, is configured to enhance entrainment of the granular product into the airstream 202 by performing one or more of the following functions: directing the flow granular product toward an inner wall of the supply line 102, to thereby increase the effective length of entrainment zones by causing the granular product to flow along the circumference of the supply line rather than across the diameter; dividing the single stream 152 into multiple streams 226,228, as illustrated in FIG. 21, to provide additional entrainment zones 230,232,234,236; and, directing the flow of granular product into the supply line 102 in a manner that provides more unobstructed area for the flow of air 202 through the supply line 102, and particularly through, the central area 153 of the supply line 102, to thereby promote increased velocity of the flow of air 202 during the entrainment process.

Figure 18:
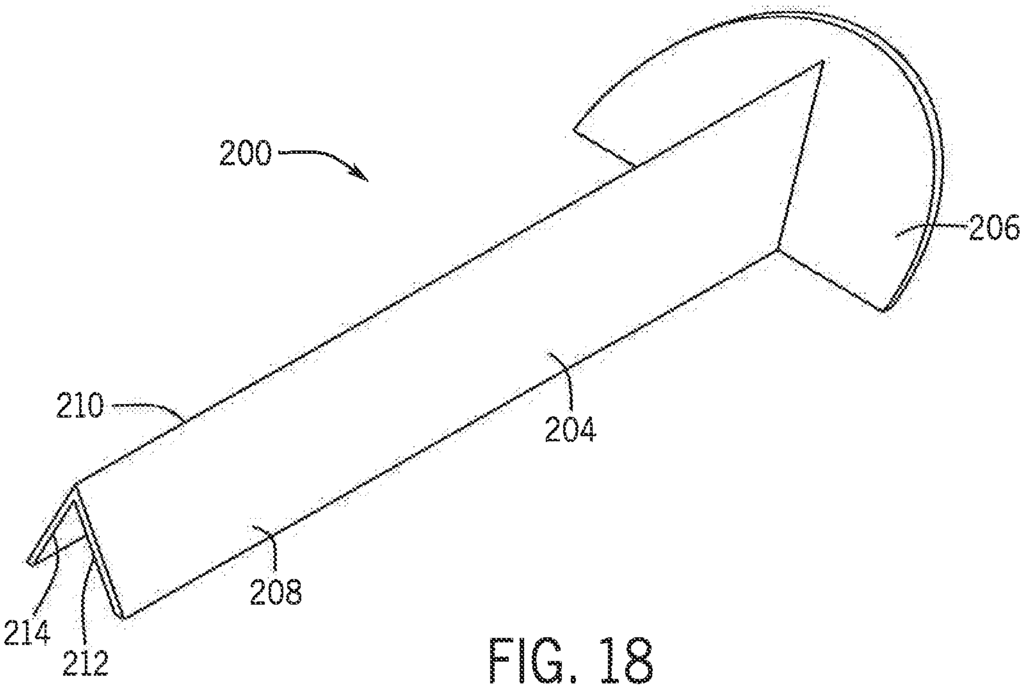
FIG. 18 illustrates an isometric view of a first exemplary embodiment of a deflector in the conveying system of the agricultural application implement of FIG. 1, in accordance with an exemplary embodiment of the present invention.

FIG. 18 shows an exemplary embodiment of a deflector 200 that is configured for performing all of the functions described in the preceding paragraph, when installed in the manner illustrated in FIGS. 19-22.

As shown in 18, the deflector 200 includes a body 204 made up of two parts, in the form of an air baffle 206 and a granular product flow director 208. The baffle 206 forms the upstream end of the body 204 of the deflector 200. The flow director 208 has an inverted V-shape, with a vertex 210 of the inverted V-shaped flow director 208 formed by joining first and second downwardly directed guide surfaces 212, 214 flaring outwardly from vertex 210.

Figure 19:
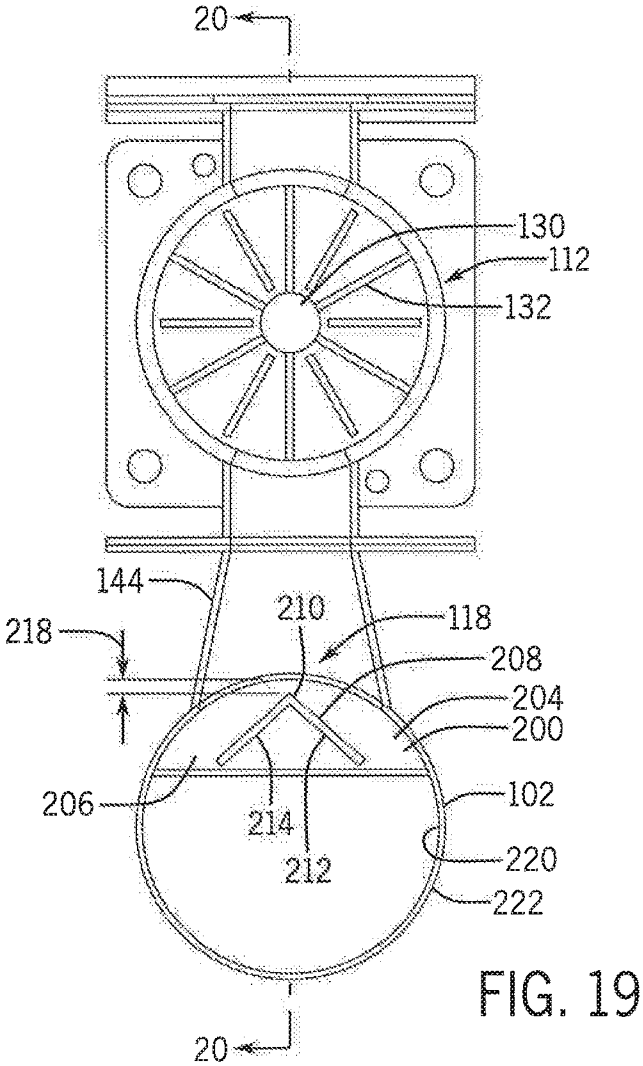
FIG. 19 illustrates an orthographic, diametric cross-section of a supply line of the conveying system showing the deflector of FIG. 19 installed in the supply line, in accordance with an exemplary embodiment of the present invention.
Figure 20:
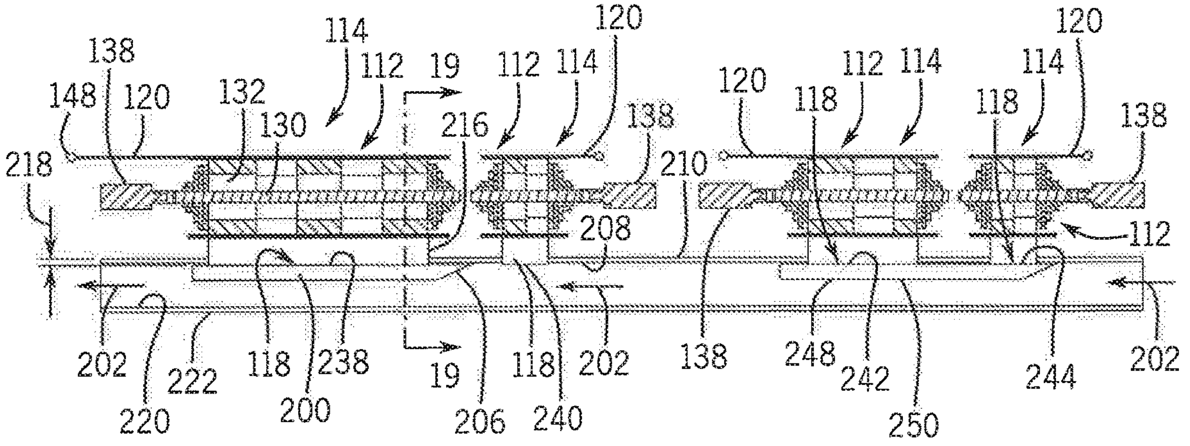
FIG. 20 illustrates an orthographic longitudinal cross-section of the supply line of FIG. 19, taken along lines 20-20 in FIG. 19, showing installation of two different exemplary embodiments of deflectors, in accordance with the invention, installed in the supply line, in accordance with an exemplary embodiment of the present invention.

As shown in FIGS. 19-20, the deflector 200 is installed adjacent one of the inflow slots 118 in the supply line 102, with the baffle 206 positioned upstream from an upstream end 216 of the inflow slot 118. The vertex 210 of the flow director 208 is oriented upward toward the inflow slot 118, in such a manner that the deflector 200 extends in a substantially longitudinal direction along and below the inflow slot 118. The vertex 210 of the flow director 208 is spaced at a distance 218 below an inner surface 220 of the wall 222 of the supply line 102. For example, in a five-inch diameter supply line 102, the top 210 of the flow director 208 might be spaced about a quarter of an inch (6.4 millimeters) from the inner surface 220 of the wall 220 of the supply line 102. The deflector 200 may be secured in place by any appropriate manner, such as by mounting lugs or straps (not shown) for fixedly attaching the deflector 200 to the supply line 102.

Figure 22:
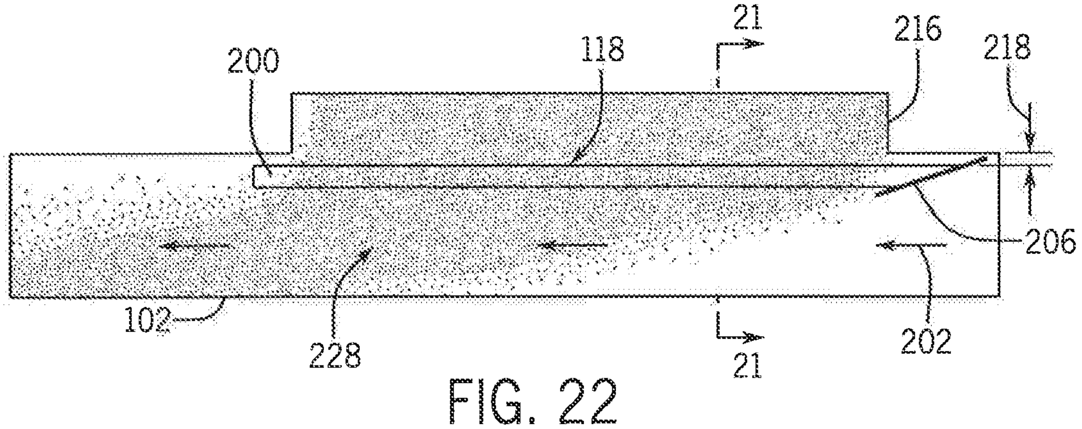
FIG. 22 illustrates an orthographic longitudinal cross-sectional diagram, taken along line 22-22 in FIG. 21, of the supply line of FIG. 19, illustrating the manner in which the deflector enhances entrainment of the granular product in a flow of air passing through the supply line, in accordance with an exemplary embodiment of the present invention.

As illustrated schematically in FIGS. 21 and 22, which correspond respectively to FIGS. 19 and 20, the flow divider section 208 of the deflector 200 causes the initial flow 224 of granular product entering the supply line through the inflow slot 118 to divide into two streams 226,228 that are directed oppositely from one another, around the central area 153, toward the inner surface 220 of the supply line 102. The two streams 226,228 of granular product define four entrainment zones 230,232,234,236 as indicated by phantom lines in FIG. 21, thus effectively doubling the number of entrainment zones 154,154 provided by single streams 152 of granular product produced at inflow slots 118 of the invention that do not include a deflector 200.

Also, because the four entrainment zones 230,232,34,236 of the embodiment shown in FIGS. 19-22 extend respectively in generally circumferential directions around and along the interfaces between the two streams 226,228 of granular product and the pressurized air 202 flowing through the supply line 102, the effective length of each of the entrainment zones 230,232,34,236 is significantly longer than it would be in embodiments where granular product generally drops diametrically across the central area 153 to provide entrainment zones 154,154 having a length slightly less than the diameter of the supply line 102.

As further illustrated in FIG. 21, inclusion of the deflector 200 also tends to keep the central area 153 of the supply line 102 more open and unobstructed, so that the velocity of the flow of air 202 remains higher than it might be if the granular product dropped directly through the central area 153 of the supply line 102. Experience has shown that maintaining velocity of the airflow 202 during the entrainment, mixing and pneumatic transport processes generally significantly enhances effectiveness and efficiency of the pneumatic conveying system 100.

As shown in FIGS. 20 and 22, the body 204 of the deflector 200 is configured such that when the deflector is installed in the supply line 102 the deflector 206 is located upstream and adjacent to the upstream end 216 of the inflow slot 118.

As further shown in FIGS. 19, 20 and 22, the baffle 206 is configured to generally protect the area adjacent the upstream end of the flow director 208 from direct impingement of the flow of air 202 in the supply line 102. The baffle 206 is also configured to slope inward in a downstream direction from the inside surface 220 of the supply line 102, in a manner that smoothly shunts a portion of the airflow 202 impinging on the upstream face of the baffle 206 downward toward the central area 153, and outward toward the inner surface 220 of the supply line 102. By directing the shunted portion of the airflow 202 in this manner, airflow 202 is increased in the central area 153 of the supply line 102 and in the four entrainment zones 230,232,234,236, thereby enhancing the desirable effects described above provided through use of the deflector 200.

As the flow of pressurized air 202 travels downstream in the supply line 102, the widths of the two streams 226,228 expand to fill the interior of the supply tube 102, as the granular product is entrained at the four entrainment zones 230,232,234,236 into the flow of air 202 in a manner that is generally more effective and efficient, in embodiments of the invention incorporating the deflector 200, than is attainable in embodiments of the invention that do not utilize some form of a deflector according to the invention. Those having skill in the art will appreciate the benefits of providing this additional entrainment efficiency and effectiveness without having to resort to more complex approaches such as mixing augers used in some prior pneumatic conveying systems.

As shown in FIG. 20, only some of the inflow slots 118 in the exemplary embodiment of the pneumatic conveying system 100 are equipped with a deflector 200 as described above. Where a supply line 102 has multiple inflow slots 118, as indicated at 238,240,242,244 in FIG. 20, only some of the slots 118, such as slot 238, may be equipped with a deflector 200 in accordance with the invention as described above that serves a single inflow slot 118. Other inflow slots 118, such as slot 240, may not utilize a deflector in accordance with the invention.

As further shown in FIG. 20, however, in embodiments of the invention such as the exemplary embodiment of the pneumatic conveying system 100, where the wall 222 of the horizontally extending supply line 102 defines two or more longitudinally spaced and aligned, longitudinally extending inflow slots 118, such as slots 238,240,242,244, that are operatively connected to receive granular product from one or more granular product compartments, an alternate embodiment of a deflector 248 may have a flow divider 250 that extends below at least two of the inflow slots 118,118, as illustrated for slots 242,244 in the supply line 102, and be configured for enhancing entrainment of the granular product 206 dropped through those at least two inflow slots 18,118 into the flow 202 of pressurized air passing through the supply line 102.

It will be appreciated that a deflector, in various embodiments of the invention may include only one, or both of a baffle and a flow director, and that a baffle and flow director may have shapes and forms differing from the exemplary embodiments expressly depicted and described herein. For example, in other embodiments of the invention, a deflector may be configured to divide and direct the flow of granular product into more, or fewer streams of granular product than the two streams provided by the exemplary embodiment of the deflector 200 specifically described above. In some embodiment of the invention, a deflector may be configured in a manner that provides more, or fewer entrainment zones than the four entrainment zones provided by the exemplary embodiment of the deflector 200. In some embodiments, a deflector may be configured to provide asymmetric division and direction of the flow of granular product into a supply line, and/or to direct a flow of the granular product both toward and along the inside wall of the supply line.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may occur to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

These and other advantages of the present invention will be apparent to those skilled in the art from the foregoing specification. Accordingly, it is to be recognized by those skilled in the art that changes or modifications may be made to the above-described embodiments without department from the broad inventive concepts of the invention. It is to be understood that this invention is not limited to the particular embodiments described herein, but it is intended to include all changes and modifications that are within the scope and spirit of this invention.

What is claimed is:

1. A granular product delivery arrangement for an agricultural product applicator, comprising:

a granular product supply compartment for housing a supply of granular product and a granular product delivery unit for dispersing granular product from the supply compartment to a ground surface;

a granular product delivery mechanism including:

a substantially horizontally extending supply line interconnecting the granular product supply compartment and the granular product delivery unit, the substantially horizontally extending supply line having a tubular wall including an inside surface defining an interior of the supply line and a longitudinal axis of the supply line;

a granular product deflector disposed in the supply line; and a pressurized air source;

wherein:

the supply line has an upstream end connected to the pressurized air source and is adapted for receiving a flow of pressurized air from the pressurized air source and a downstream end operatively attached to the granular product delivery unit;

the supply line defines an inflow slot extending through an upper surface of the wall of the supply line, the inflow slot having a length extending along the longitudinal axis from an upstream end to a downstream end of the inflow slot and being configured for dropping granular product from the supply compartment into the interior of the supply line in the flow of pressurized air in the supply line to entrain the dropped granular product in the flow of pressurized air passing through the supply line; and the deflector having a body operatively attached below the inflow slot in the supply line and configured to disperse the granular product dropped into the interior of the supply line to enhance entrainment of the granular product in the flow of pressurized air passing through the supply line.

2. The granular product delivery arrangement of claim 1, wherein the body of the deflector includes an air baffle disposed in the supply line adjacent the upstream end of the inflow slot in the wall of the supply line and configured for directing and accelerating the flow of pressurized air away from the inflow slot toward at least one of the interior of the supply line and the inside surface of the wall of the supply line.

3. A granular product delivery arrangement for an agricultural product applicator, comprising:

a granular product supply compartment for housing a supply of granular product and a granular product delivery unit for dispersing granular product from the supply compartment to a ground surface;

a granular product delivery mechanism including:

a substantially horizontally extending supply line interconnecting the granular product supply compartment and the granular product deliver unit, the substantially horizontally extending supply line having a tubular wall including an inside surface defining an interior of the supply line and a longitudinal axis of the supply line;

a granular product deflector disposed in the supply line; and a pressurized air source;

wherein:

the supply line has an upstream end connected to the pressurized air source and is adapted for receiving a flow of pressurized air from the pressurized air source and a downstream end operatively attached to the granular product deliver unit;

the supply line defines an inflow slot extending through an upper surface of the wall of the supply line, the inflow slot having a length extending along the longitudinal axis from an upstream end to a downstream end of the inflow slot and being configured for dropping granular product from the supply compartment into the interior of the supply line in the flow of pressurized air in the supply line to entrain the dropped granular product in the flow of pressurized air passing through the supply line;

the deflector has a body operatively attached below the inflow slot in the supply line and configured to disperse the granular product dropped into the interior of the supply line to enhance entrainment of the granular product in the flow of pressurized air passing through the supply line;

the granular product supply compartment has one or more granular product compartments and the wall of the horizontally extending supply line defines two or more longitudinally spaced and aligned, longitudinally extending inflow slots operatively connected to receive granular product from one or more of the granular product compartments; and the deflector body extends below at least two of the inflow slots in the supply line and is configured for enhancing entrainment of the granular product dropped through those at least two inflow slots into the flow of pressurized air passing through the supply line.

4. The granular product delivery arrangement of claim 1, wherein the body of the deflector is spaced at a distance below the inner surface of the supply line.

5. The granular product delivery arrangement of claim 1, wherein the body of the deflector is configured to direct the granular product dropping into the supply line toward the inside surface of the wall of the supply line adjacent the inflow slot.

6. A granular product delivery arrangement for an agricultural product applicator, comprising:

a granular product supply compartment for housing a supply of granular product and a granular product delivery unit for dispersing granular product from the supply compartment to a ground surface;

a granular product delivery mechanism including:

a substantially horizontally extending supply line interconnecting the granular product supply compartment and the granular product delivery unit, the substantially horizontally extending supply line having a tubular wall including an inside surface defining an interior of the supply line and a longitudinal axis of the supply line;

a granular product deflector disposed in the supply line; and a pressurized air source;

wherein:

the supply line has an upstream end connected to the pressurized air source and is adapted for receiving a flow of pressurized air from the pressurized air source and a downstream end operatively attached to the granular product delivery unit;

the supply line defines an inflow slot extending through an upper surface of the wall of the supply line, the inflow slot having a length extending along the longitudinal axis from an upstream end to a downstream end of the inflow slot and being configured for dropping granular product from the supply compartment into the interior of the supply line in the flow of pressurized air in the supply line to entrain the dropped granular product in the flow of pressurized air passing through the supply line;

the deflector has a body operatively attached below the inflow slot in the supply line and is configured to disperse the granular product dropped into the interior of the supply line to enhance entrainment of the granular product in the flow of pressurized air passing through the supply line;

the body of the deflector is configured to direct the granular product dropping into the supply line toward the inside surface of the wall of the supply line adjacent the inflow slot; and the body of the deflector is configured for dividing the granular product dropping into the supply line through the inflow slot into at least a first and a second stream of the granular product and directing the first and second streams of granular product in opposite directions toward the inside surface of the wall of the supply line adjacent the inflow slot.

7. The granular product delivery arrangement of claim 6, wherein the body of the deflector extends in the longitudinal direction and includes at least first and second downwardly directed guide surfaces flaring outwardly from the inflow slot in the supply line toward opposite sides of the inner surface of the wall of the supply line, for dividing the granular product dropping into the supply line through the inflow slot into at least a first and a second stream of the granular product, and directing the first and second streams of granular product in opposite directions toward the inside surface of the wall of the supply line.

8. The granular product delivery arrangement of claim 7, wherein the body of the deflector has an inverted V-shape, with a vertex of the inverted V-shape pointing upward toward the inflow slot and extending in a substantially longitudinal direction.

9. A granular product delivery arrangement for an agricultural product applicator, comprising:

a granular product supply compartment for housing a supply of granular product and a granular product delivery unit for dispersing granular product from the supply compartment to a ground surface;

a granular product delivery mechanism including:

a substantially horizontally extending supply line interconnecting the granular product supply compartment and the granular product delivery unit, the substantially horizontally extending supply line having a tubular wall including an inside surface defining an interior of the supply line and a longitudinal axis of the supply line;

a granular product deflector disposed in the supply line; and a pressurized air source;

wherein:

the supply line has an upstream end connected to the pressurized air source and is adapted for receiving a flow of pressurized air from the pressurized air source and a downstream end operatively attached to the granular product delivery unit;

the supply line defines an inflow slot extending through an upper surface of the wall of the supply line, the inflow slot having a length extending along the longitudinal axis from an upstream end to a downstream end of the inflow slot and being configured for dropping granular product from the supply compartment into the interior of the supply line in the flow of pressurized air in the supply line to entrain the dropped granular product in the flow of pressurized air passing through the supply line;

the deflector having a body operatively attached below the inflow slot in the supply line and configured to disperse the granular product dropped into the interior of the supply line to enhance entrainment of the granular product in the flow of pressurized air passing through the supply line;

the body of the deflector is spaced at a distance below the inner surface of the supply line and configured to direct the granular product dropping into the supply line toward the inside surface of the wall of the supply line adjacent the inflow slot, and includes an air baffle disposed in the supply line adjacent the upstream end of the inflow slot in the wall of the supply line, with the baffle being configured for directing and accelerating the flow of pressurized air away from the inflow slot toward at least one of the interior of the supply tube and the inside surface of the supply line;

the body of the deflector extends in the longitudinal direction and includes at least first and second downwardly directed guide surfaces flaring outwardly from the inflow slot in the supply tube toward opposite sides of the inside surface of the wall of the supply tube, for dividing the granular product dropping into the supply tube through the inflow slot into at least a first and a second stream of the granular product, and directing the first and second streams of granular product in opposite directions toward the inside surface of the wall of the supply tube.

10. An agricultural product applicator having a granular product supply compartment and a granular product delivery unit for dispersing granular product from the supply compartment to a ground surface, comprising:

a granular product delivery arrangement including:

a substantially horizontally extending supply tube;

a granular product deflector disposed in the supply tube; and a pressurized air source;

wherein:

the substantially horizontally extending supply tube has a tubular wall including an inside surface defining an interior of the supply tube and a longitudinal axis of the supply tube;

the supply tube has an upstream end in communication with the pressurized air source to receive a flow of pressurized air therefrom and a downstream end operatively attached to the granular product delivery unit;

the supply tube defining an inflow slot extending through an upper surface of the wall of the supply tube, with the inflow slot having a length extending along the longitudinal axis from an upstream end to a downstream end of the inflow slot and being configured for dropping granular product from the supply compartment into the interior of the supply tube to entrain the dropped granular product in the flow of pressurized air passing through the supply line; and the deflector having a body operatively attached below the inflow slot in the supply line and configured to disperse the granular product in the interior of the supply line and enhance entrainment of the granular product dropped through the inflow slot into the flow of pressurized air passing through the supply line.

11. The agricultural product applicator of claim 10, wherein the body of the deflector includes an air baffle disposed in the supply line adjacent the upstream end of the inflow slot in the wall of the supply line and configured for directing and accelerating the flow of pressurized air away from the inflow slot toward at least one of the interior of the supply line and the inside surface of the supply line.

12. An agricultural product applicator having a granular product supply compartment and a granular product delivery unit for dispersing granular product from the supply compartment to a ground surface, comprising:

a granular product delivery arrangement including:

a substantially horizontally extending supply tube;

a granular product deflector disposed in the supply tube; and a pressurized air source;

wherein:

the substantially horizontally extending supply tube has a tubular wall including an inside surface defining an interior of the supply tube and a longitudinal axis of the supply tube;

the supply tube has an upstream end in communication with the pressurized air source to receive a flow of pressurized air therefrom and a downstream end operatively attached to the granular product delivery unit;

the supply tube defining an inflow slot extending through an upper surface of the wall of the supply tube, with the inflow slot having a length extending along the longitudinal axis from an upstream end to a downstream end of the inflow slot and being configured for dropping granular product from the supply compartment into the interior of the supply tube to entrain the dropped granular product in the flow of pressurized air passing through the supply line;

the deflector having a body operatively attached below the inflow slot in the supply line and configured to disperse the granular product in the interior of the supply line and enhance entrainment of the granular product dropped through the inflow slot into the flow of pressurized air passing through the supply line;

the granular product supply compartment has one or more granular product compartments and the wall of the horizontally extending supply line defines two or more longitudinally spaced and aligned, longitudinally extending inflow slots operatively connected to receive granular product from one or more of the granular product compartments; and the deflector body extends below at least two of the inflow slots in the supply line and is configured for enhancing entrainment of the granular product dropped through those at least two inflow slots into the flow of pressurized air passing through the supply line.

13. The agricultural product applicator of claim 10, wherein the body of the deflector is spaced at a distance below the inner surface of the supply line.

14. The agricultural product applicator of claim 10, wherein the body of the deflector is configured to direct the granular product dropping into the supply line toward the inside surface of the wall of the supply line adjacent the inflow slot.

15. An agricultural product applicator having a granular product supply compartment and a granular product delivery unit for dispersing granular product from the supply compartment to a ground surface, comprising:

a granular product delivery arrangement including:

a substantially horizontally extending supply tube;

a granular product deflector disposed in the supply tube; and a pressurized air source;

wherein:

the substantially horizontally extending supply tube has a tubular wall including an inside surface defining an interior of the supply tube and a longitudinal axis of the supply tube;

the supply tube has an upstream end in communication with the pressurized air source to receive a flow of pressurized air therefrom and a downstream end operatively attached to the granular product delivery unit;

the supply tube defining an inflow slot extending through an upper surface of the wall of the supply tube, with the inflow slot having a length extending along the longitudinal axis from an upstream end to a downstream end of the inflow slot and being configured for dropping granular product from the supply compartment into the interior of the supply tube to entrain the dropped granular product in the flow of pressurized air passing through the supply line;

the deflector having a body operatively attached below the inflow slot in the supply line and configured to disperse the granular product in the interior of the supply line and enhance entrainment of the granular product dropped through the inflow slot into the flow of pressurized air passing through the supply line;

the body of the deflector is configured to direct the granular product dropping into the supply line toward the inside surface of the wall of the supply line adjacent the inflow slot; and the body of the deflector is configured for dividing the granular product dropping into the supply line through the inflow slot into at least a first and a second stream of the granular product and directing the first and second streams of granular product in opposite directions toward the inside surface of the wall of the supply line adjacent the inflow slot.

16. The agricultural product applicator of claim 15, wherein the body of the deflector extends in the longitudinal direction and includes at least first and second downwardly directed guide surfaces flaring outwardly from the inflow slot in the supply line toward opposite sides of the inner surface of the wall of the supply line, for dividing the granular product dropping into the supply line through the inflow slot into at least a first and a second stream of the granular product, and directing the first and second streams of granular product in opposite directions toward the inside surface of the wall of the supply line.

17. The agricultural product applicator of claim 16, wherein the body of the deflector has an inverted V-shape, with a vertex of the inverted V-shape pointing upward toward the inflow slot and extending in a substantially longitudinal direction.

18. An agricultural product applicator having a granular product supply compartment and a granular product delivery unit for dispersing granular product from the supply compartment to a ground surface, comprising:

a granular product delivery arrangement including:

a substantially horizontally extending supply tube; and a granular product deflector disposed in the supply tube; and a pressurized air source;

wherein:

the substantially horizontally extending supply tube has a tubular wall including an inside surface defining an interior of the supply tube and a longitudinal axis of the supply tube;

the supply tube has an upstream end in communication with the pressurized air source to receive a flow of pressurized air therefrom and a downstream end operatively attached to the granular product delivery unit;

the supply tube defining an inflow slot extending through an upper surface of the wall of the supply tube with the inflow slot having a length extending along the longitudinal axis from an upstream end to a downstream end of the inflow slot and being configured for dropping granular product from the supply compartment into the interior of the supply tube to entrain the dropped granular product in the flow of pressurized air passing through the supply line;

the deflector having a body operatively attached below the inflow slot in the supply line and configured to disperse the granular product in the interior of the supply line and enhance entrainment of the granular product dropped through the inflow slot into the flow of pressurized air passing through the supply line;

the body of the deflector is spaced at a distance below the inner surface of the supply line and configured to direct the granular product dropping into the supply line toward the inside surface of the wall of the supply line adjacent the inflow slot, and includes an air baffle disposed in the supply line adjacent the upstream end of the inflow slot in the wall of the supply line, with the baffle being configured for directing and accelerating the flow of pressurized air away from the inflow slot toward at least one of the interior of the supply line and the inside surface of the supply line; and the body of the deflector extends in the longitudinal direction and includes at least first and second downwardly directed guide surfaces flaring outwardly from the inflow slot in the supply line toward opposite sides of the inside surface of the wall of the supply line, for dividing the granular product dropping into the supply line through the inflow slot into at least a first and a second stream of the granular product, and directing the first and second streams of granular product in opposite directions toward the inside surface of the wall of the supply line.

* * * * *